US007449850B2

(12) United States Patent
Muroi

(10) Patent No.: US 7,449,850 B2
(45) Date of Patent: Nov. 11, 2008

(54) DEVICE AND METHOD FOR CONTROLLING MOTOR

(75) Inventor: Kazushige Muroi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 11/528,645

(22) Filed: Sep. 28, 2006

(65) Prior Publication Data

US 2007/0075664 A1 Apr. 5, 2007

(30) Foreign Application Priority Data

Sep. 30, 2005 (JP) ............................ 2005-286460
Dec. 28, 2005 (JP) ............................ 2005-380138

(51) Int. Cl.
*H02P 1/00* (2006.01)

(52) U.S. Cl. ........................ 318/270; 318/163; 388/904

(58) Field of Classification Search ................. 318/270, 318/163; 388/904
See application file for complete search history.

(56) References Cited

U.S. PATENT DOCUMENTS

| | | | | |
|---|---|---|---|---|
| 5,220,547 | A * | 6/1993 | Yasukawa et al. | 369/30.16 |
| 5,485,065 | A * | 1/1996 | Kaneko et al. | 318/270 |
| 5,932,979 | A * | 8/1999 | Sun | 318/400.23 |
| 6,118,240 | A * | 9/2000 | Yasunaga et al. | 318/270 |
| 6,702,420 | B2 * | 3/2004 | Tanaka | 347/19 |
| 6,729,712 | B2 * | 5/2004 | Kobayashi et al. | 347/19 |
| 6,822,411 | B2 * | 11/2004 | Kobayashi | 318/560 |
| 6,838,855 | B2 * | 1/2005 | Kobayashi et al. | 318/800 |
| 6,911,792 | B2 * | 6/2005 | Fasen | 318/116 |
| 7,168,783 | B2 * | 1/2007 | Naito | 347/37 |

FOREIGN PATENT DOCUMENTS

| | | |
|---|---|---|
| JP | 10-175751 | 6/1998 |
| JP | 10-230604 | 9/1998 |
| JP | 2002-345277 | 11/2002 |
| JP | 2003-136713 | 5/2003 |
| JP | 2003-225999 | 8/2003 |
| JP | 2004-251799 | 9/2004 |

* cited by examiner

*Primary Examiner*—Lincoln Donovan
*Assistant Examiner*—David S Luo
(74) *Attorney, Agent, or Firm*—Banner & Witcoff, Ltd

(57) ABSTRACT

A motor control method/device is provided in which a speed change during a deceleration period is stabilized in performing a speed feedback control of a motor. In the motor control method/device, the speed feedback control is performed such that a speed of a body driven by the motor is consistent with a predetermined target speed. A deceleration directive corresponding to time elapsed since a predetermined deceleration control start timing is generated as the target speed using a deceleration function of the elapsed time, to perform the speed feedback control based on the deceleration directive, during a deceleration control period. The deceleration control period starts from the deceleration control start timing and ends when the driven body is stopped. The deceleration function monotonically decreases from the deceleration control start timing until the deceleration directive becomes zero (0) and its derivative is a monotonically decreasing or increasing function or a constant.

22 Claims, 24 Drawing Sheets

QUADRATIC FUNCTION (OPEN UPWARD)

QUADRATIC FUNCTION (OPEN DOWNWARD)

DEVICE AND METHOD FOR CONTROLLING MOTOR

CROSS-REFERENCE TO RELATED APPLICATIONS

This application claims the benefit of Japanese Patent Applications No. 2005-286460 filed Sep. 30, 2005 and No. 2005-380138 filed Dec. 28, 2005 in the Japan Patent Office, the disclosures of which are incorporated herein by reference.

BACKGROUND

This invention relates to a device and a method for controlling a motor which performs a speed feedback control such that the speed of a body driven by the motor is consistent with a target speed.

There is a wide variety of bodies driven by a motor. One of such driven bodies is a carriage mounting a recording head thereon in a serial printer is one of them. A known method for controlling a motor when driving a carriage includes a position feedback control as well as a speed feedback control so that not only the speed but also the stop position of the carriage can be controlled.

FIG. 25 shows a particular structure of a motor control device including both a position feedback control and a speed feedback control. As shown in FIG. 25, a conventional motor control device 100 includes a position feedback (FB) controller 101, and a speed feedback controller 105. The position feedback controller 101 compares a current position Xn of a controlled body (carriage) 107 with a predetermined target stop position Xt. In order to make the position Xn consistent with the position Xt, the position feedback controller 101 performs a position feedback control and outputs a speed directive v corresponding to a difference between the positions Xn and Xt. The speed feedback controller 105 compares the speed directive (i.e., target speed) v received from the position feedback controller 101 with an actual traveling speed Vn of the controlled body 107. In order to make the speed v consistent with the speed Vn, the speed feedback controller 105 performs a speed feedback control and generates a manipulated variable u to be given to the controlled body 107.

The speed directive v outputted from the position feedback controller 101 is not directly inputted to the speed feedback controller 105. The speed directive V is inputted as a speed directive vf of which upper limit is limited to a target speed $V_t$ by a speed directive corrector 103. That is, if the speed directive v from the position feedback controller 101 is not more than the target speed $V_t$, the speed directive v is inputted to the speed feedback controller 105 as is. When the speed directive v from the position feedback controller 101 exceeds the target speed $V_t$, the target speed $V_t$ is inputted to the speed feedback controller 105.

As noted above, the motor control device 100 of FIG. 25 is designed to perform a cascade control consisting of two types of feedback loops. More particularly, the motor control device 100 is configured to include a cascade control system having position information as the major feedback and speed information as the minor feedback. Accordingly, high precision is achieved in stopping the controlled body 107 at the target stop position Xt.

However, in the motor control device 100 configured with the cascade control system as above, active operation of the position feedback control often inhibits a stable speed change during a deceleration period.

The present invention is made to solve the above problem. It would be desirable that a speed change during a deceleration period may be stabilized in performing a speed feedback control of a motor which drives a body.

SUMMARY

It is desirable that, in a motor control method of the present invention, a speed feedback control of a motor is performed such that a speed of a body driven by the motor is consistent with a predetermined target speed. A deceleration directive corresponding to time elapsed since a predetermined deceleration control start timing is generated as the target speed using a deceleration function of the elapsed time, to perform the speed feedback control based on the generated deceleration directive, during a deceleration control period in a driving period. The driving period is from when the body starts to be driven until it is stopped. The deceleration control period starts from the deceleration control start timing and ends when the driven body is stopped. The deceleration function is a function which monotonically decreases from the deceleration control start timing until the deceleration directive becomes zero (0). A derivative of the deceleration function is a monotonically decreasing or increasing function or a constant.

The target speed of the speed feedback control until the deceleration control period starts may vary, for example, over time. A constant speed may be simply set as a target value (target constant speed). Alternatively, the target speed may be generated, for example, by a position feedback control. That is, the target speed until the deceleration control period starts may be arbitrarily determined.

According to the above motor control method, a deceleration directive is generated from a time-dependent deceleration function as the target speed during the deceleration control period. The speed feedback control is performed based on the generated deceleration directive. Since the deceleration function is a function of the time elapsed since the deceleration control start timing, the deceleration directive is uniquely defined in accordance with the elapsed time. That is, if the elapsed time is known, the deceleration directive at the time can be calculated based on the deceleration function.

The monotonically decreasing or increasing function in the above should be broadly interpreted. That is, a function which has a constant section in the course of increase or decrease may be also included. However, since there is a condition that the derivative of such a deceleration function is a monotonic function or a constant, it is inevitable that there is no period during which the deceleration directive is constant in the course of monotonic decrease in the deceleration function.

A deceleration function which satisfies the above condition is, for example, a linear function having a negative slope, a part of a graph of a quadratic function opening downward which is monotonically decreasing from the maximum value, a part of a graph of a quadratic function opening upward which is monotonically decreasing toward the minimum value, a part of a graph of a monotonically decreasing cubic function which is monotonically decreasing toward the inflection point, or a part of a cosine function which is monotonically decreasing.

As noted above, the motor control method of the present invention does not use a position feedback control, but simply uses the aforementioned deceleration function to obtain the deceleration directive corresponding to the time elapsed since the starting point of the deceleration control period. The speed feedback control is then performed based on the obtained deceleration directive.

Accordingly, a speed change of the driven body during deceleration is stable in the deceleration control period. As a result, generation of noise is prevented due to an unstable speed change.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

First Embodiment (1) Structure of Multi Function Apparatus

Figure 1:
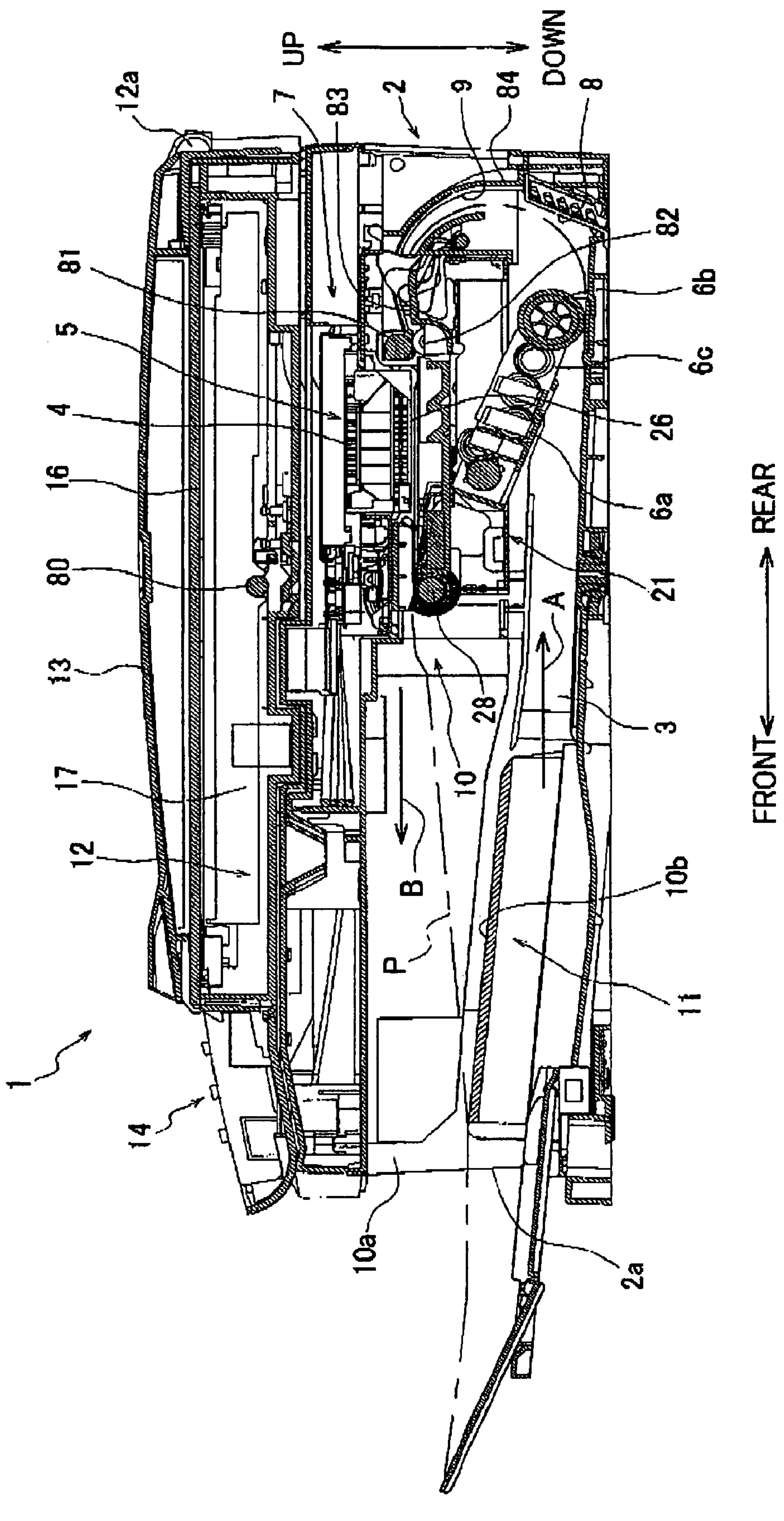
FIG. 1 is a cross sectional side view of a multi function apparatus according to a first embodiment.

A multi function apparatus 1 (MFD) of the present embodiment is provided with a printer function, a copying function, a scanner function and a facsimile function. As shown in FIG. 1, an image reading apparatus 12 used for reading a document is provided above a housing 2.

The image reading apparatus 12 is designed to be opened and closed with respect to the housing 2 about a not shown pivot shank provided at a left end of the image reading apparatus 12. A cover 13 which covers the upper surface of the image reading apparatus 12 is turnably attached so as to be opened and closed with respect to the image reading apparatus 12 about a pivot shaft 12*a* provided at a rear end of the cover 13.

A glass plate 16 is provided on an upper surface of the image reading apparatus 12. When the cover 13 is opened up, a document can be set on the glass plate 16 to be read. A contact image scanner (CIS) 17 for reading a document is provided below the glass plate 16. The contact image scanner can reciprocate along a guide shaft 80 which extends in a direction orthogonal to the sheet surface of FIG. 1 drawing (main scanning direction or right and left direction).

An operation panel 14 including operation buttons for input operation and a liquid crystal display (LCD) for displaying various information is provided at the front of the image reading apparatus 12.

A feeding unit 11 for feeding recording paper P is provided at the bottom of the housing 2. The feeding unit 11 includes a paper cassette 3 which can be attached to or detached from the housing 2 in a cross direction via an opening 2*a* which is formed at the front side of the housing 2. In the present embodiment, the paper cassette 3 is designed to store a plurality of recording paper P in A4, letter, legal, and postcard sizes in a stack (accumulated manner). The recording paper P is arranged such that its narrow sides (width) extend in a direction orthogonal (main scanning direction or right and left direction) to a paper feeding direction (sub-scanning direction, cross direction, or direction of an arrow A).

A tilted separator 8 for separation of the recording paper is disposed at the back (rear end) side of the paper cassette 3. The tilted separator 8 is formed into a convex curvature in a plan view so as to protrude at the middle and to be dented toward the right and left ends in a width direction (right and left direction) of the recording paper P. A saw-edged elastic separation pad (not shown) is provided at the middle in the width direction of the recording paper P. The separation pad abuts the front edge of the recording paper P to expedite the separation.

Behind the feeding unit 11, a feed arm 6*a* for feeding the recording paper P from the paper cassette 3 is turnably attached so as to swing up and down on its anchor end. A rotational driving force from an LE (conveying) motor 54 (see FIG. 4) is transmitted to a feed roller Sb provided at a tip end of the arm Ga via a gear transmission mechanism 6*c* provided inside the feed arm 6*a*. The recording paper P stacked in the paper cassette 3 is separately conveyed sheet by sheet by the feed roller 6*b* and the aforementioned elastic separation pad of the tilted separator 8.

The recording paper P which is separated to advance in the paper feeding direction (direction of the arrow A) is fed to a recording unit 7 via a paper feeding path 9 which includes a U-turn path formed in a space between a first feeding guide 84 and a second feeding guide 83. The recording unit 7 is provided above the paper cassette 3, and functions as a printer (image forming apparatus).

Figure 2:
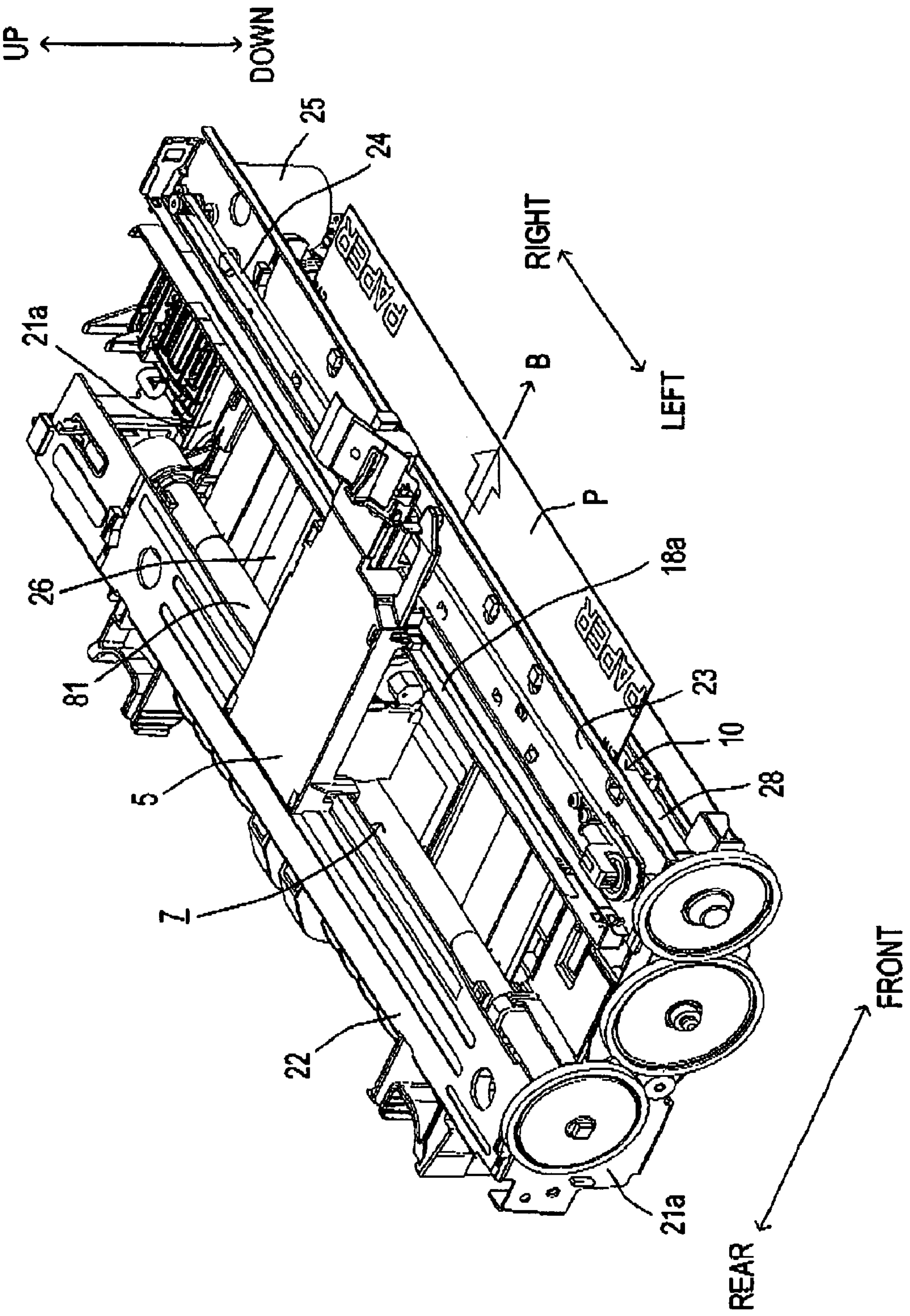
FIG. 2 is a perspective view showing a structure of a recording unit in the multi function apparatus shown in FIG. 1.

As seen from FIG. 2, the recording unit 7 is provided between a main frame 21 (see FIG. 1) formed into a box opened upward and first and second plate-like guide members 22 and 23 which are supported by a pair of right and left side boards 21*a* of the main frame 21 and extend in the right and left direction (main scanning direction). The recording unit 7 includes an ink-jet recording head 4 (see FIG. 1) which ejects ink from the bottom side to record an image on the recording paper P, and a carriage 5 which mounts the recording head 4 thereon.

The carriage 5 is slidably supported between the first guide member 22 located upstream and the second guide member 23 located downstream in a discharge direction (direction of an arrow B). The carriage 5 is designed to reciprocate in the right and left direction. In order to reciprocate the carriage 5, a timing belt 24 makes a loop on the upper side of the second guide member 23 in a manner to extend in the main scanning direction (right and left direction). A CR (carriage) motor 25 which drives the timing belt 24 is fixed to the down side of the second guide member 23.

At the rear of the timing belt 24, a timing slit 18*a* is provided in parallel to the timing belt 24 (i.e. main scanning direction). Slits having a constant width and a certain interval therebetween (e.g., 1/150 inches=approximately 0.17 mm) are formed on the timing slit 18*a*. A detection unit (not shown) including a photo interrupter is provided below the carriage 5. The photo interrupter includes one light emitting element and two light receiving elements arranged on the opposite side of the timing slit 18*a* from the light emitting element. The detection unit and the timing slit 18*a* constitute a linear encoder 18 (see FIG. 5).

Figure 3:
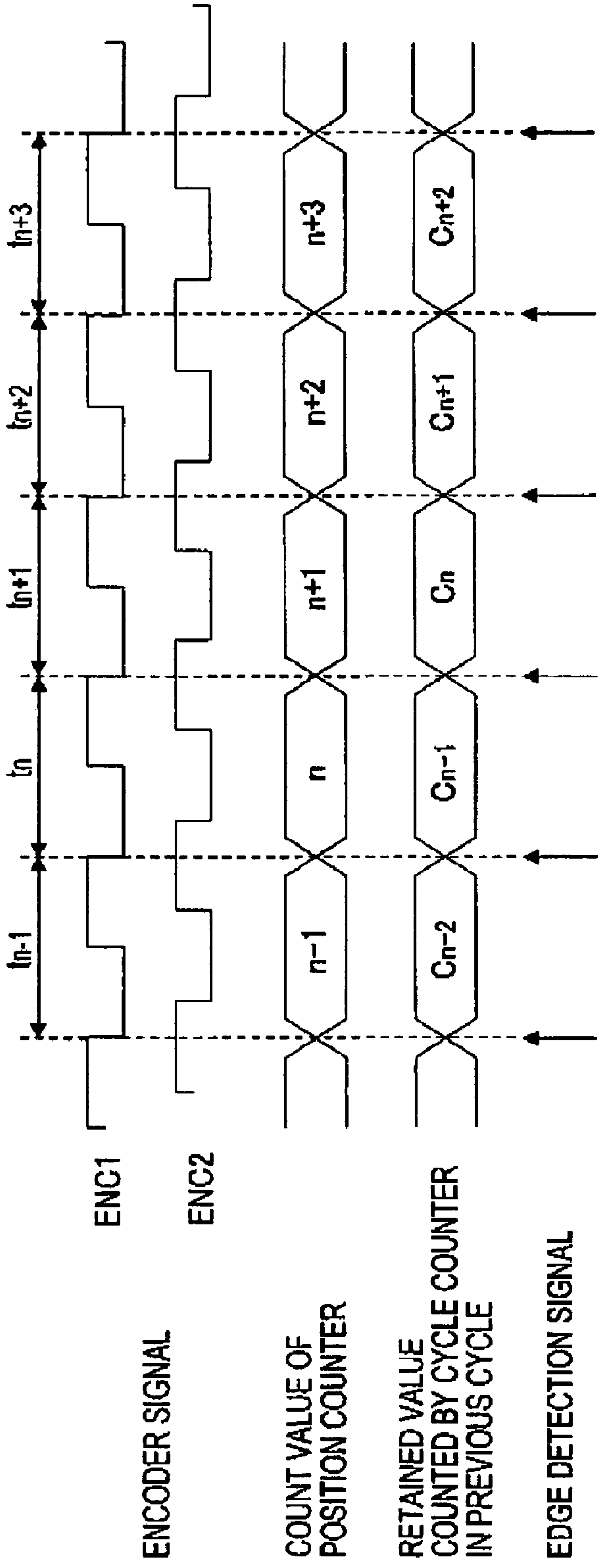
FIG. 3 is a explanatory diagram showing an output pattern of encoder signal.

As shown in FIG. 3, the detection unit constituting the linear encoder 18 outputs two types of encoder signal, ENC1, ENC 2. The phase of ENC1 and the phase of ENC2 are shifted by a predetermined cycle (1/4 cycles, in the present embodiment). When the carriage 5 is moved in a forward direction, that is, from the home position (left end position in FIG. 2) to the right, the phase of ENC1 is advanced ahead of the phase of ENC2 by the predetermined cycle. When the carriage 5 is moved in a reverse direction, that is, from the right end to the home position, the phase of ENC1 is delayed from the phase of ENC2 by the predetermined cycle.

A flat platen 26 is provided below the recording head 4 of the carriage 5 in the recording unit 7. The flat platen 26 faces the recording head 4 and extends in the right and left direction. The platen 26 is fixed to the main frame 21 between the guide members 22 and 23.

A conveying roller 81 that conveys the recording paper P to the under side of the recording head 4 and a nip roller 82 (see FIG. 1) biased to the conveying roller 81 side to face the conveying roller 81 are provided on the upstream side in the discharge direction (direction of the arrow B) of the platen 26. A discharge roller 28 driven to convey the recording paper P which has passed the recording unit 7 to the discharge unit 10 along the discharge direction (direction of the arrow B) and a spur roller (not shown) biased to the discharge roller 28 side to face the discharge roller 28 are provided on the downstream side of the discharge direction (direction of the arrow B) of the platen 26.

The discharge unit 10 is disposed above the feeding unit 11. The recording paper P recorded in the recording unit 7 is discharged to the discharge unit 10 with its recording surface upward. A discharge hole 10*a*, together with the opening 2*a*, opens toward the front of the housing 2. The recording paper P discharged along the discharge direction (direction of the arrow B) from the discharge unit 10 is accumulated and stored on the discharge tray 10*b* located inside the opening 2*a*.

A not shown ink storage is provided on the right end at the front of the housing 2 below the image reading apparatus 12. Four ink cartridges are provided in the ink storage, which respectively store black (Bk) ink, cyan (C) ink, magenta (M) ink, and yellow (Y) ink for full color recording. The respective ink cartridges can be attached to and detached from the ink storage when the image reading apparatus 12 is opened upward. The respective ink cartridges and the recording head 4 are connected via four flexible ink supply tubes. Ink stored in the respective ink cartridges is supplied to the recording head 4 via the ink supply tubes.

Figure 4:
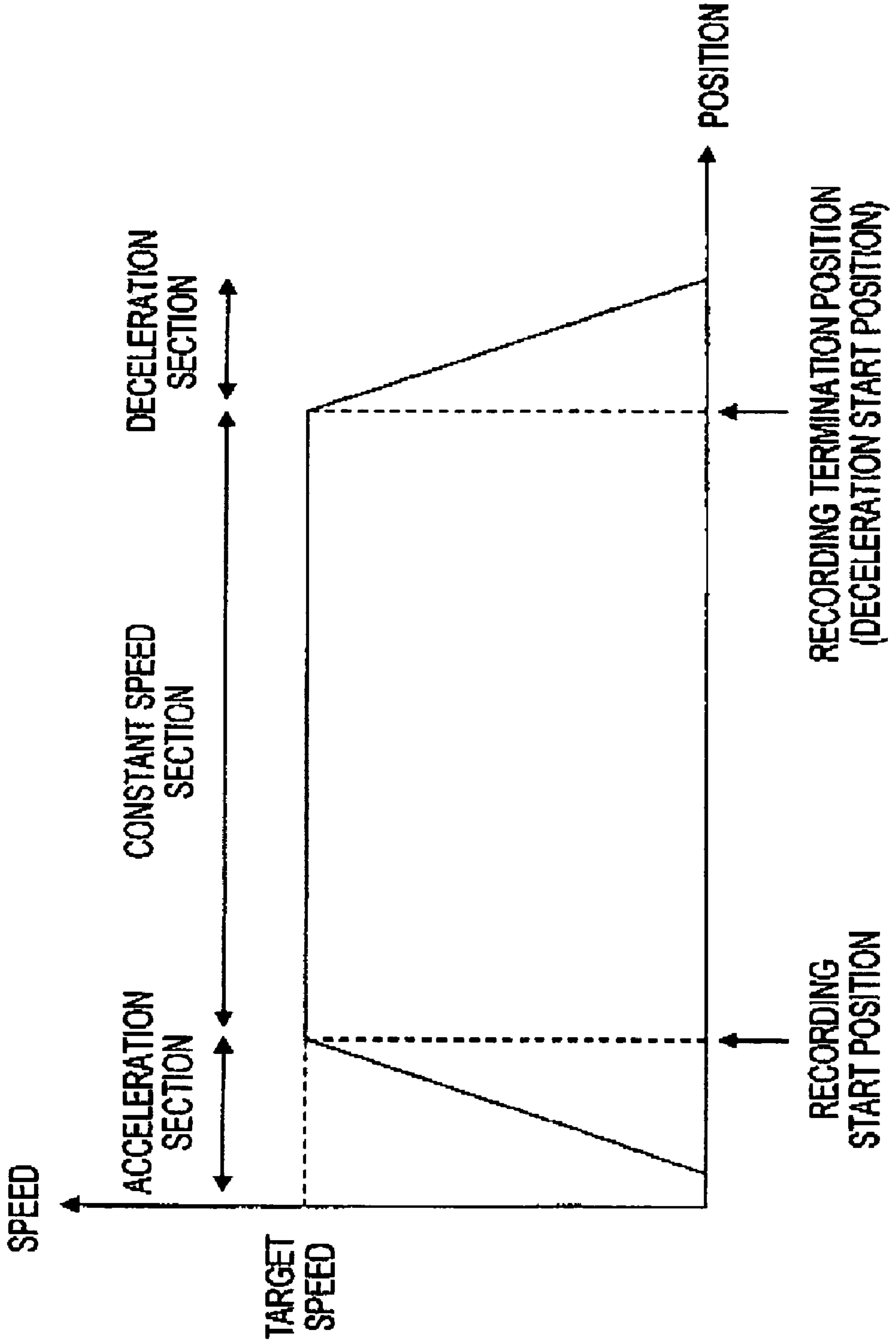
FIG. 4 is a diagram showing a traveling state of a carriage.

In the above carriage driving mechanism, when a recording process is not performed, the carriage 5, as shown in FIG. 4, stands by at the home position near the left end of the FIG. 2 drawing or a position where the last recording has ended (hereinafter, the position from which the carriage 5 starts to be moved is referred to as an “original position”). When the recording process is started, the carriage 5 is accelerated so as to achieve a target speed before reaching a predetermined recording start position. Then, the carriage 5 is moved at a certain target speed till it reaches a predetermined recording termination position. After passing the recording termination position, the carriage 5 is decelerated until it stops.

(2) Structure of Carriage Control Device

Figure 5:
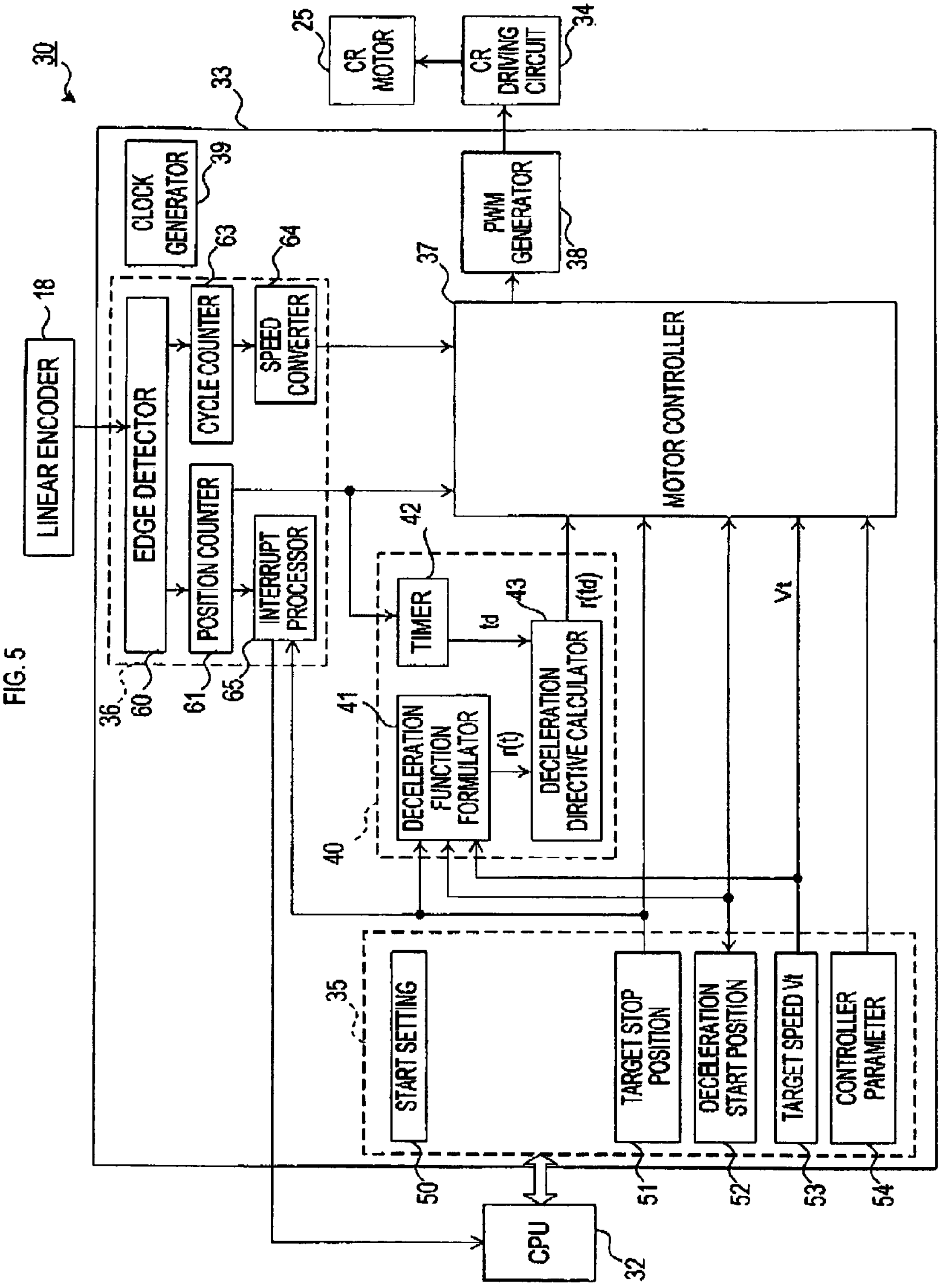
FIG. 5 is a block diagram showing a schematic structure of a carriage control device according to the first embodiment.

Referring to FIG. 5, a carriage control device 30 is provided inside of the printer. The carriage control device 30 includes a CPU 32 that manages controls of the printer, an ASIC (Application Specific Integrated Circuit) 33 that generates a PWM (Pulse Width Modulation) signal controlling a rotation speed and a rotation direction of the CR motor 25, and a motor driving circuit (CR driving circuit) 34 that controls four FETs (Field-Effect Transistors) in an H-bridge circuit based on the PWM signal generated by the ASIC 33 to drive the CR motor 25.

The ASIC 33 includes a register group 35 that stores various parameters for use in controlling the CR motor 25, a carriage position measurer 36 that calculates the position and the traveling speed of the carriage 5 according to the encoder signals ENC1 and ENC2 received from the linear encoder 18, a motor controller 37 that generates a motor control signal for controlling a rotation speed of the CR motor 25 based on the various parameters stored in the register group 35 and data obtained from the carriage position measurer 36, a PWM generator 38 that generates a PWM signal having a duty ratio corresponding to the motor control signal generated by the motor controller 37, a clock generator 39 that supplies a clock signal having a cycle sufficiently shorter than the cycle of the encoder signals ENC1 and ENC2, to each part of the ASIC 33, and a deceleration directive generator 40 that generates a deceleration directive r(td) (td: time elapsed since the carriage 5 has reached a deceleration start position) as a target speed used by the motor controller 37 during a deceleration period starting from arrival of the carriage 5 at the deceleration start position and ending in arrival at a target stop position.

The register group 35 includes a start setting register 50 that is used to start the CR motor 25, a target stop position setting register 51 that is used to set the target stop position where the carriage 5 should stop, a deceleration start position setting register 52 that is used to set the deceleration start position (same position as a recording termination position) where deceleration of the carriage 5 is started, a target speed setting register 53 that is used to set the target speed (speed at a constant drive during image forming) $V_t$ of the carriage 5, and a controller parameter setting register 54 that is used to set various parameters for use in the motor controller 37.

The carriage position measurer 36 includes: an edge detector 60 that detects an edge detection signal indicating the start/end of each cycle of an encoder signal ENC1 (that is, particularly an edge of ENC1 when ENC2 is at a high level) based on encoder signals ENC1 and ENC2 from the linear encoder 18, and a rotation direction of the CR motor 25 (forward direction if a leading edge of ENC1 is detected, and reverse direction if a trailing edge of ENC1 is detected); a position counter 61 that detects which slit from the home position the carriage 5 is located by incrementing (in the case of the forward direction) or decrementing (in the case of the reverse direction) the number of the edge detection signal according to the rotation direction of the CR motor 25 (i.e., traveling direction of the carriage 5) detected by the edge detector 60; a cycle counter 63 that counts an interval at which the edge detection signal from the edge detector 60 is generated by a clock signal; a speed converter 64 that calculates the traveling speed of the carriage 5 based on a distance (1/150 inches) between the slits of the timing slit 18*a* and time tn−1 (=Cn−1×clock cycle period) specified by a retained value Cn−1 which is a value counted by the cycle counter 63 in the previous cycle of the encoder signal ENC1; and an interrupt processor 65 that outputs a stop interrupt signal to the CPU 32 when a count value obtained from the position counter 61 is equal to or more than the target stop position set in the target stop position setting register 51.

Figure 6:
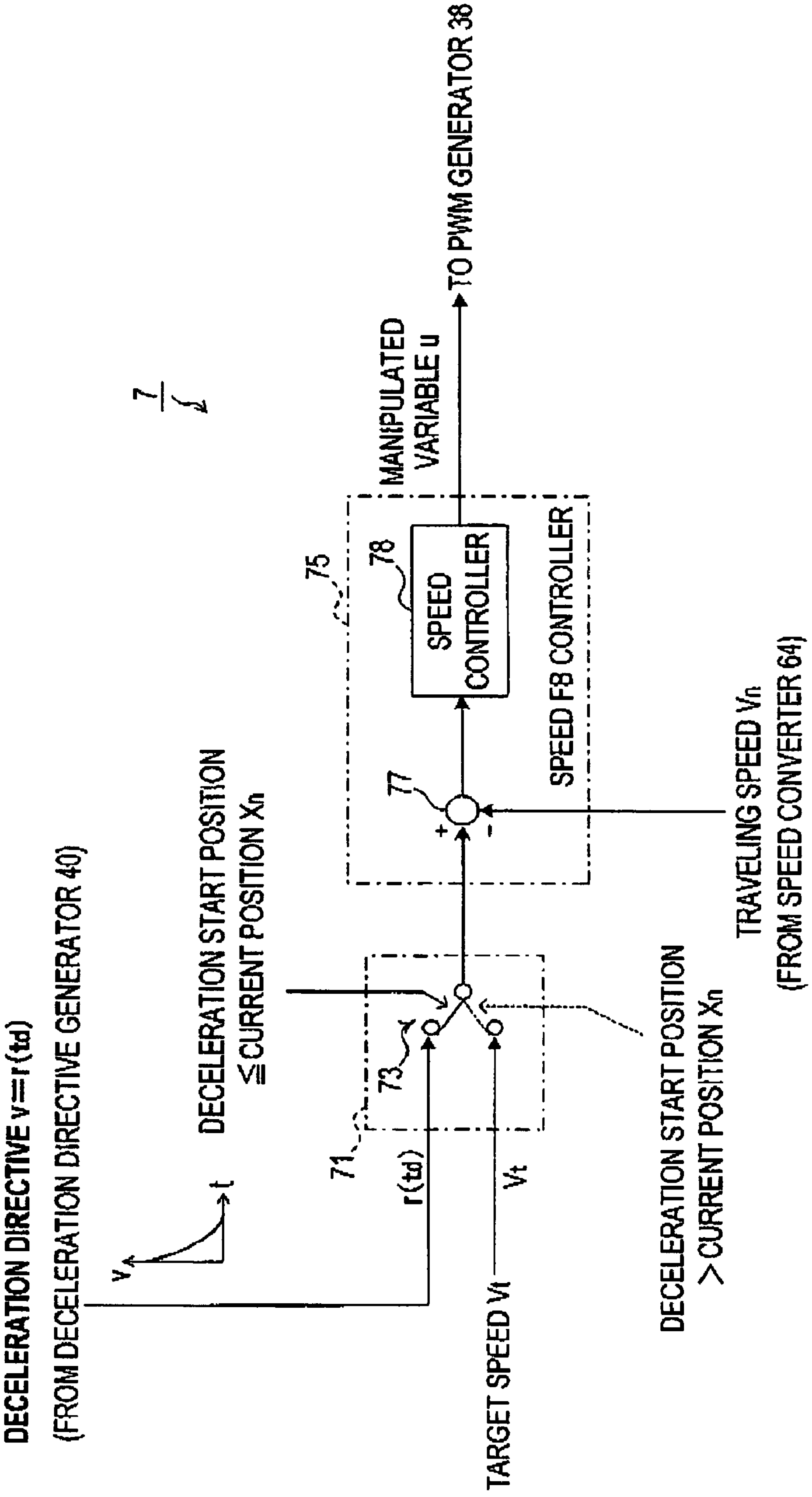
FIG. 6 is a block diagram showing a structure of a motor controller inside the motor control device according to the first embodiment.

The motor controller 37, as shown in FIG. 6, includes: a speed directive selector 71 that selects one of the target speed $V_t$ set in the target speed setting register 53 and the deceleration directive r(td) generated by the deceleration directive generator 40 to be outputted as a speed directive; and the speed feedback controller 75 that performs a speed feedback control (e.g., PID control) such that the speed directive (one of the target speed $V_t$ and the deceleration directive r(td)) received from the speed directive selector 71 is consistent with the traveling speed of the carriage 5 calculated by the speed converter 64 to generate a manipulated variable u.

In the motor controller 37, the speed directive selector 71 is designed to switch between the target speed $V_t$ set in the target speed setting register 53 and the deceleration directive r(td) generated by the deceleration directive generator 40 by a switch 73. The switch 73 is shifted into a position on the target speed $V_t$ side when the current position Xn of the carriage 5 determined by the count value of the position counter 61 is smaller than the deceleration start position set in the deceleration start position setting register 52, that is, until the carriage 5 reaches the deceleration start position. The switch 73 is shifted to a position on the deceleration directive r(td) side when the current position Xn of the carriage 5 is or larger than the deceleration start position set in the deceleration start position setting register 52, that is, after the carriage 5 has reached the deceleration start position.

In the speed feedback controller 75, a difference between the speed directive received from the speed directive selector 71 and the traveling speed Vn of the carriage 5 from the speed converter 64 is calculated by an adder 77. Based on the result of the calculation, a PID control is performed by the speed controller 78 to calculate the manipulated variable u. That is, until the carriage 5 reaches the deceleration start position, the speed feedback control is performed based on the target speed $V_t$, while after the carriage 5 has reached the deceleration start position, the speed feedback control is performed based on the deceleration directive r(td).

As shown in FIG. 5, the deceleration directive generator 40 which generates the deceleration directive r(td) in the ASIC 33 includes a deceleration function formulator 41 that formulates a deceleration function r(t) from which a deceleration directive is generated, a timer 42 that measures time elapsed td since the carriage 5 has reached the deceleration start position, and a deceleration directive calculator 43 that calculates the deceleration directive r(td) at the elapsed time td using the deceleration function r(t).

Figure 7:
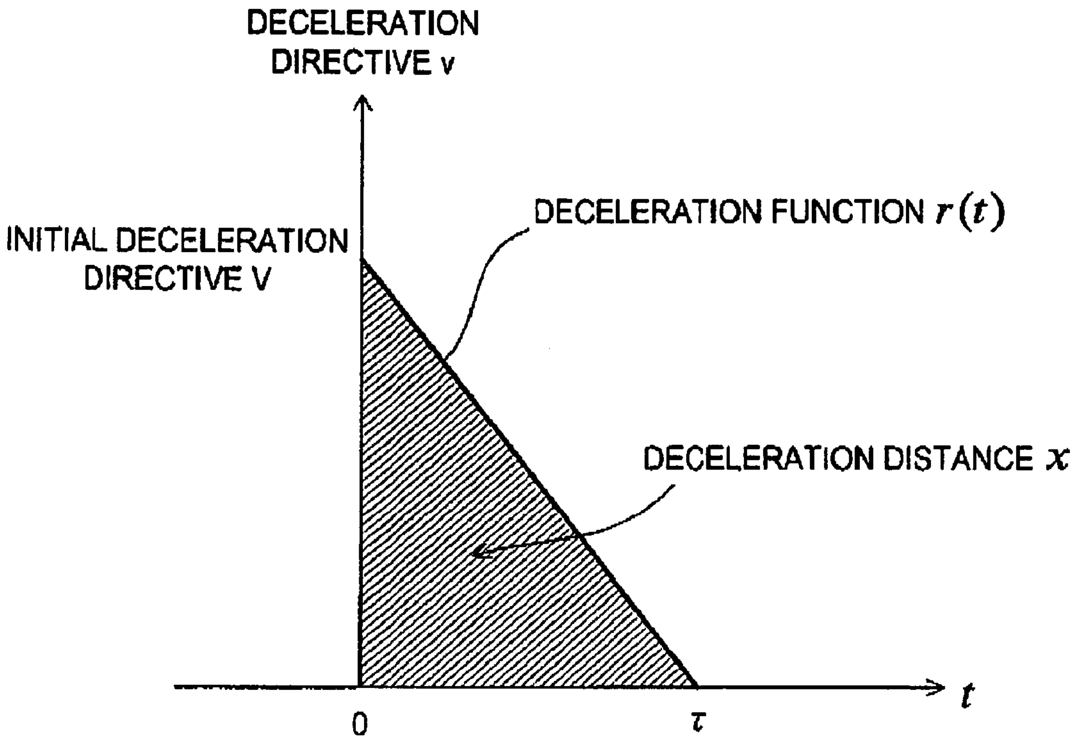
FIG. 7 is a diagram for explanation on a formulation of a deceleration function by a deceleration function formulator of the present invention.

Here, the deceleration function r(t) is formulated based on a predetermined deceleration distance x and an initial deceleration directive V, in principle. How the deceleration function r(t) is formulated is schematically explained by way of FIG. 7. FIG. 7 is an example of a deceleration function r(t) showing a deceleration directive v starting from the deceleration control start timing (t=0). A linear function is shown to simplify the explanation.

The deceleration function r(t) is a linear function. Thus, the deceleration function r(t) can be expressed as r(t)=−At+V, where A is an unknown coefficient. Time $\tau$ elapsed until the deceleration directive becomes zero (0) is not yet known. Here, it is already known that the deceleration function r(t) passes a point ($\tau$, 0) and a result of integrating the deceleration function r(t) from time t=0 to $\tau$ is equal to the deceleration distance x. Accordingly, A and $\tau$ can be obtained by a calculation.

Figure 8:
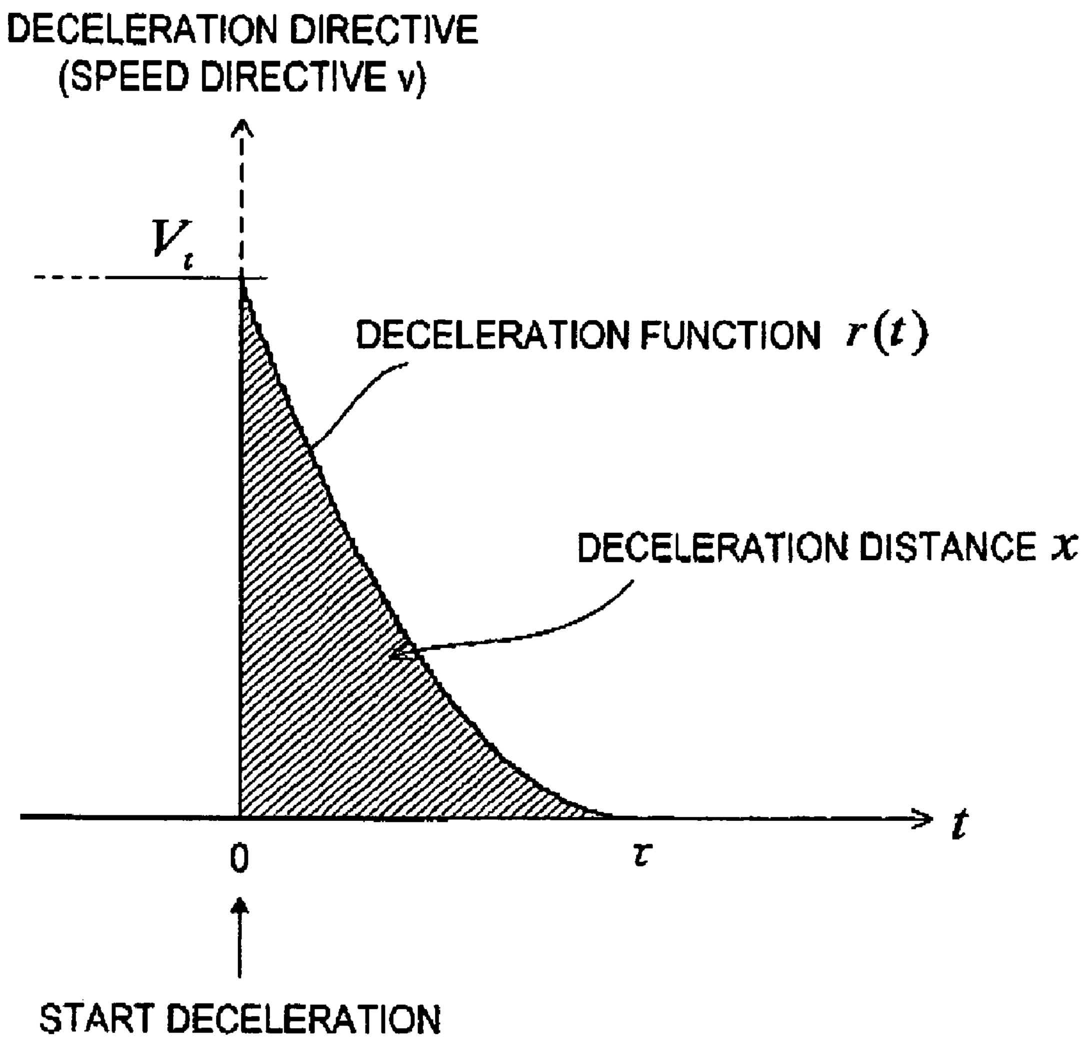
FIG. 8 is a diagram for explanation on a deceleration function r(t) expressed by a quadratic function having a graph opening upward.

The deceleration function formulator 41 in the present embodiment is designed to formulate a quadratic function having a graph opening upward, as shown in FIG. 8, as the deceleration function r(t). The deceleration function r(t) is formulated every time the carriage 5 is driven, that is, each time the carriage 5 travels to one of the sides in a main scanning direction. The formulation is based on the target stop position, deceleration start position and the target speed $V_t$ set in the register group 35.

(3) Formulation of Deceleration Function r(t)

FIG. 8 schematically explains formulation of the deceleration function r(t) by the deceleration function formulator 41. In FIG. 8, a horizontal axis shows the time elapsed since the carriage 5 has reached the deceleration start position, and a vertical axis indicates the deceleration directive r(td). Here, a waveform in which the deceleration directive becomes zero (0) when the given time $\tau$ has elapsed since the beginning of deceleration (t=0), is defined as the deceleration function r(t) (quadratic function in the present embodiment) to be formulated. The quadratic function has a minimum value when t=$\tau$.

Accordingly, the function r(t) can be expressed as below.

$$r(t)=A(t-\tau)^2 \tag{1}$$

where A is a proportional constant.

Since the above deceleration function passes a point (0, $V_t$), the formula (1) can be expressed as below.

$$V_t=A\tau^2 \tag{2}$$

On the other hand, since the deceleration start position and the target stop position are known, the deceleration distance x which is a travel distance of the carriage 5 from the beginning of deceleration to the stop can be known by a difference between the deceleration start position and the target stop position. Furthermore, since the deceleration distance x is consistent with a value obtained by integrating the deceleration function r(t) from the time t=0 to τ, another formula can be obtained as below.

$$x = \int_0^{\tau} A(t-\tau)^2\,dt = \frac{1}{3}A\tau^3 \tag{3}$$

From the above formulas (2) and (3), τ and A can be determined as below.

$$\tau = \frac{3x}{V_t}, \qquad A = \frac{V_t^3}{(3x)^2} \tag{4}$$

Accordingly, the deceleration function r(t) is obtained as below.

$$r(t) = \frac{V_t^3}{(3x)^2}\left(t - \frac{3x}{V_t}\right)^2 \tag{5}$$

If the above formula (5) is formulated as the deceleration function r(t) by the deceleration function formulator 41, the deceleration directive r(td) at the elapsed time td is calculated using the deceleration function r(t) by the deceleration directive calculator 43. As a result, when deceleration of the carriage 5 is started after arrival of the carriage 5 at the deceleration start position, the deceleration directive r(td) is gradually decreased to zero (0) along the waveform of the deceleration function r(t) shown in FIG. 8.

Figure 9:
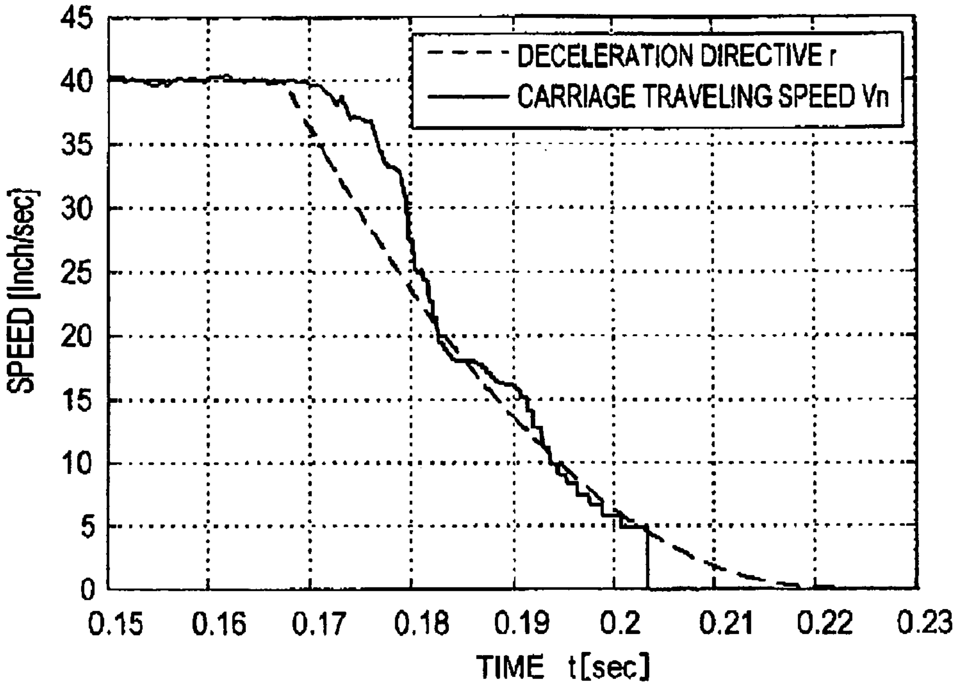
FIG. 9 is a graph showing respective transition of a deceleration directive r and a carriage traveling speed Vn during a deceleration period according to the first embodiment.

FIG. 9 shows respective transition in the deceleration directive r and the actual traveling speed Vn of the carriage 5 when a deceleration control (speed feedback control) of the carriage 5 is performed based on the deceleration directive generated as above by the deceleration directive generator 40.

Figure 10:
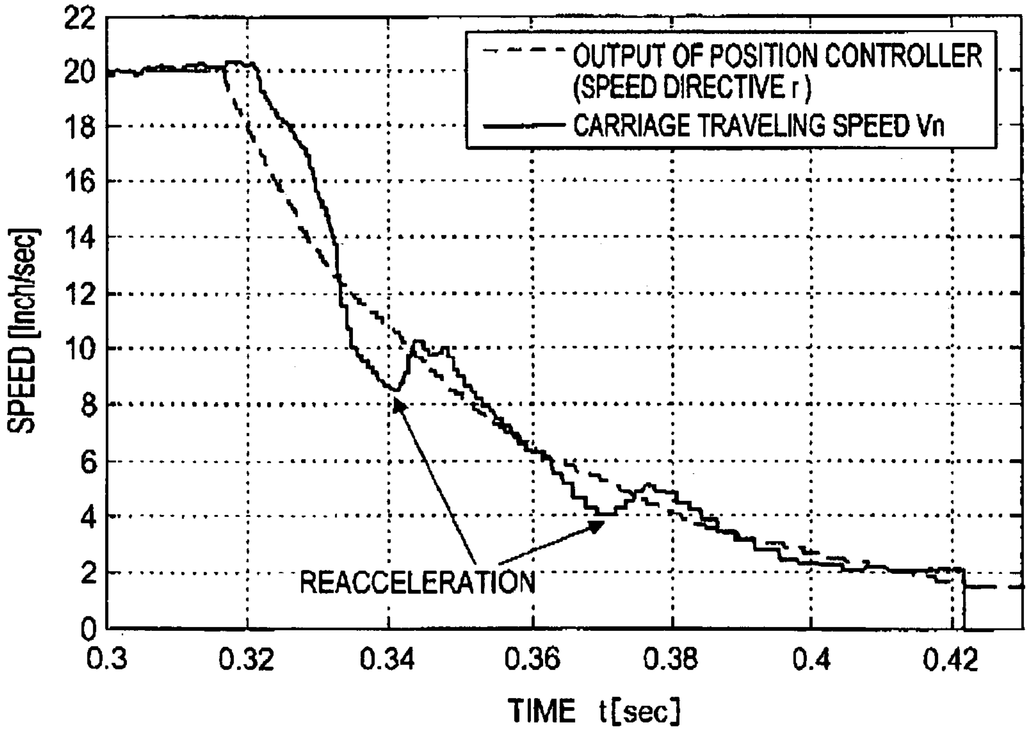
FIG. 10 PRIOR ART
FIG. 10 is a graph showing respective transition of a deceleration directive r and a carriage traveling speed Vn during a deceleration period in a conventional motor control device.

In comparison, transition in a traveling speed according to a conventional control method is shown in FIG. 10. In the conventional control method, reacceleration of a carriage 5 occurs during the deceleration control. The reason for occurrence of the reacceleration is as follows.

When the drive of the carriage 5 is shifted from the constant speed drive to the deceleration control, the speed directive which has been constant suddenly starts to drop. However since the deceleration control is a feedback control, the traveling speed Vn does not immediately respond to the rapid decrease in the speed directive and gradually starts to decrease. As a result, a difference between the speed directive and the actual traveling speed Vn becomes large.

Figure 25:
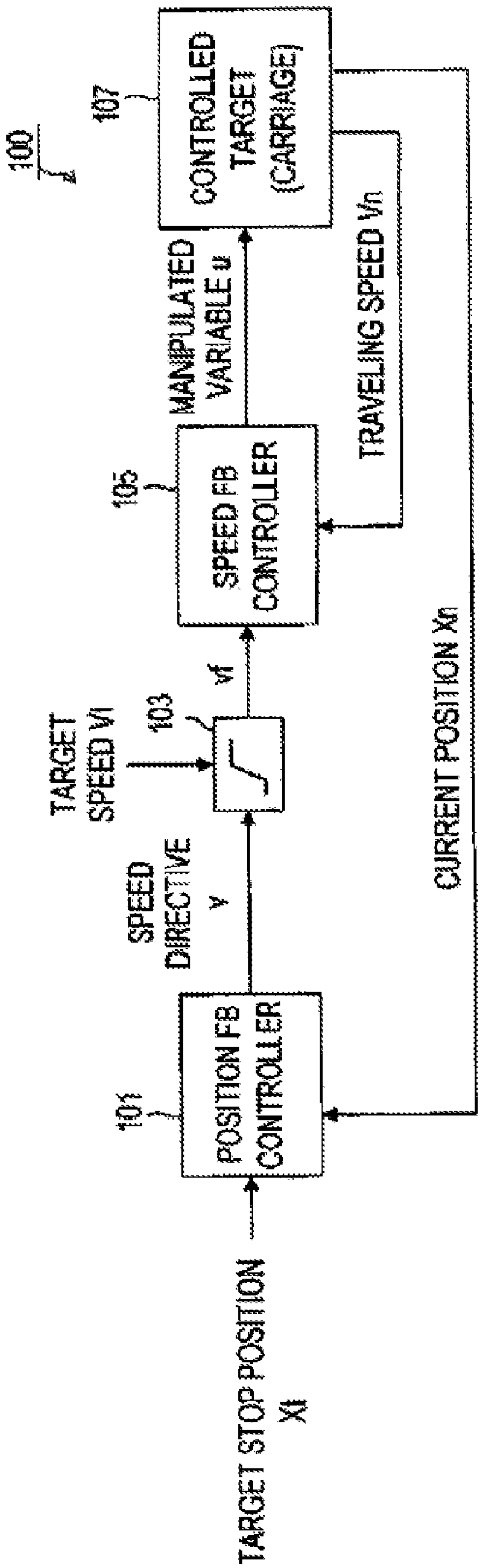
FIG. 25 PRIOR ART
FIG. 25 is a block diagram showing a conventional motor control device.

Then, the position feedback controller 101 (see FIG. 25) operates so that a decreasing slope of the speed directive v is gentle in order to bring the carriage 5 close to the target stop position Xt at an early stage. It can be seen from FIG. 10 that the decreasing slope of the speed directive v becomes slightly gentle around reacceleration timings.

As the slope of the speed directive v becomes gentle as such, the traveling speed Vn of the carriage 5 by little by little comes close to a speed corresponding to the speed directive v. Then, the position feedback controller 101 again steepens the decreasing slope of the speed directive v. Since the position feedback controller 101 endeavors to strictly follow a position control as such, the carriage 5 is inevitably susceptible to reacceleration during the deceleration period.

As is clear from FIGS. 9 and 10, the traveling speed Vn of the carriage 5 is decelerated without being reaccelerated in the present embodiment. This is because a position feedback control is not used in the present embodiment, but simply the deceleration directive according to the deceleration function r(t) expressed in a quadratic function having a graph opening upward is submitted to the speed feedback controller 75.

Not only the deceleration function r(t) itself is a monotonically decreasing function, but also its derivative dr(t)/dt is a monotonic function (monotonically increasing function). Submission of the deceleration directive according to the elapsed time using such a deceleration function r(t) prevents the actual traveling speed Vn from being accelerated again. If reacceleration is prevented, the carriage 5 can stop in a stable manner. Also, generation of noise resulting from looseness of the carriage 5 is avoided.

The traveling speed Vn of the carriage 5 is suddenly dropped to zero (0) approximately past the time t=0.2 [sec]. This is because the carriage 5 has reached the target position at this timing and triggered a later-explained braking control, and because the travel distance until the carriage 5 completely is stopped by the braking control is so little as to be detected by the linear encoder 18.

(4) Process Performed in CPU and ASIC

Figure 11:
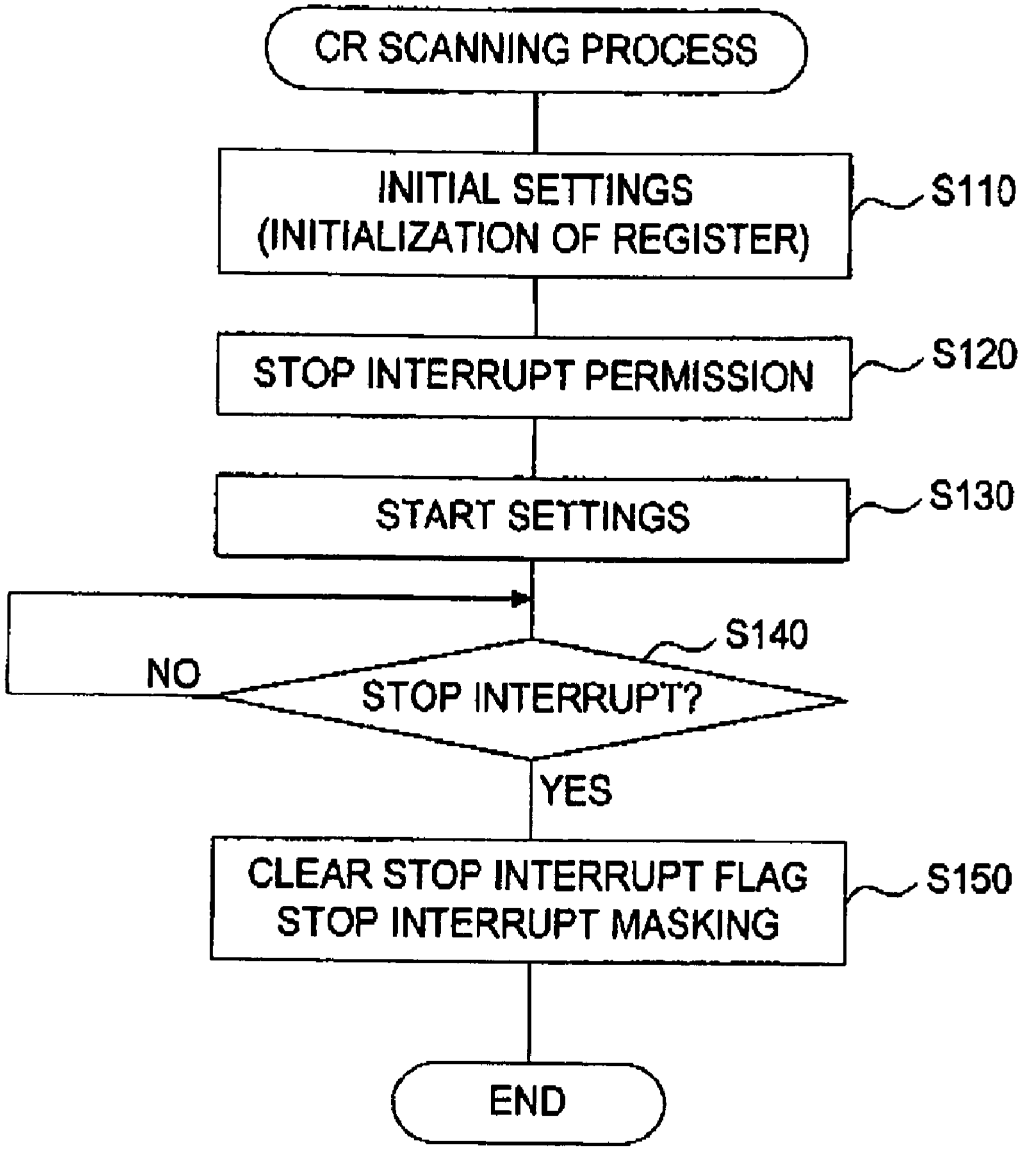
FIG. 11 is a flowchart showing a carriage scanning process performed by a CPU.

From now on, explanation on a CR scanning process performed by the CPU 32 is given by way of FIG. 11.

When the CR scanning process is started, firstly, initialization is performed in the ASIC 33 (S110). That is, the respective registers constituting the register group 35 are initialized. After the initialization, the CPU 32 operates and outputs stop interrupt permission to the ASIC 33 (S120). Thereby, the ASIC 33 is now able to output a stop interrupt signal.

The ASIC 33 which has been given stop interrupt permission detects every stop of the carriage 5 at the target stop position set in the target stop position setting register 51 via the interrupt processor 65 and inputs a stop interrupt signal to the CPU 32.

After the step of S120, the CPU 32 initializes the start setting register 50 (S130). The ASIC 33 starts calculation of the manipulated variable u, and the CR motor 25 is driven to start to drive the carriage 5. The control of the CR motor 25 which is started hereinafter is basically handled by the ASIC 33. The CPU 32 stands by for a stop interrupt signal in S140.

When a stop interrupt signal is outputted from the ASIC 33, the CPU 32 clears a stop interrupt flag, and performs interrupt masking so as not to receive a stop interrupt signal thereafter (S150).

Figure 12:
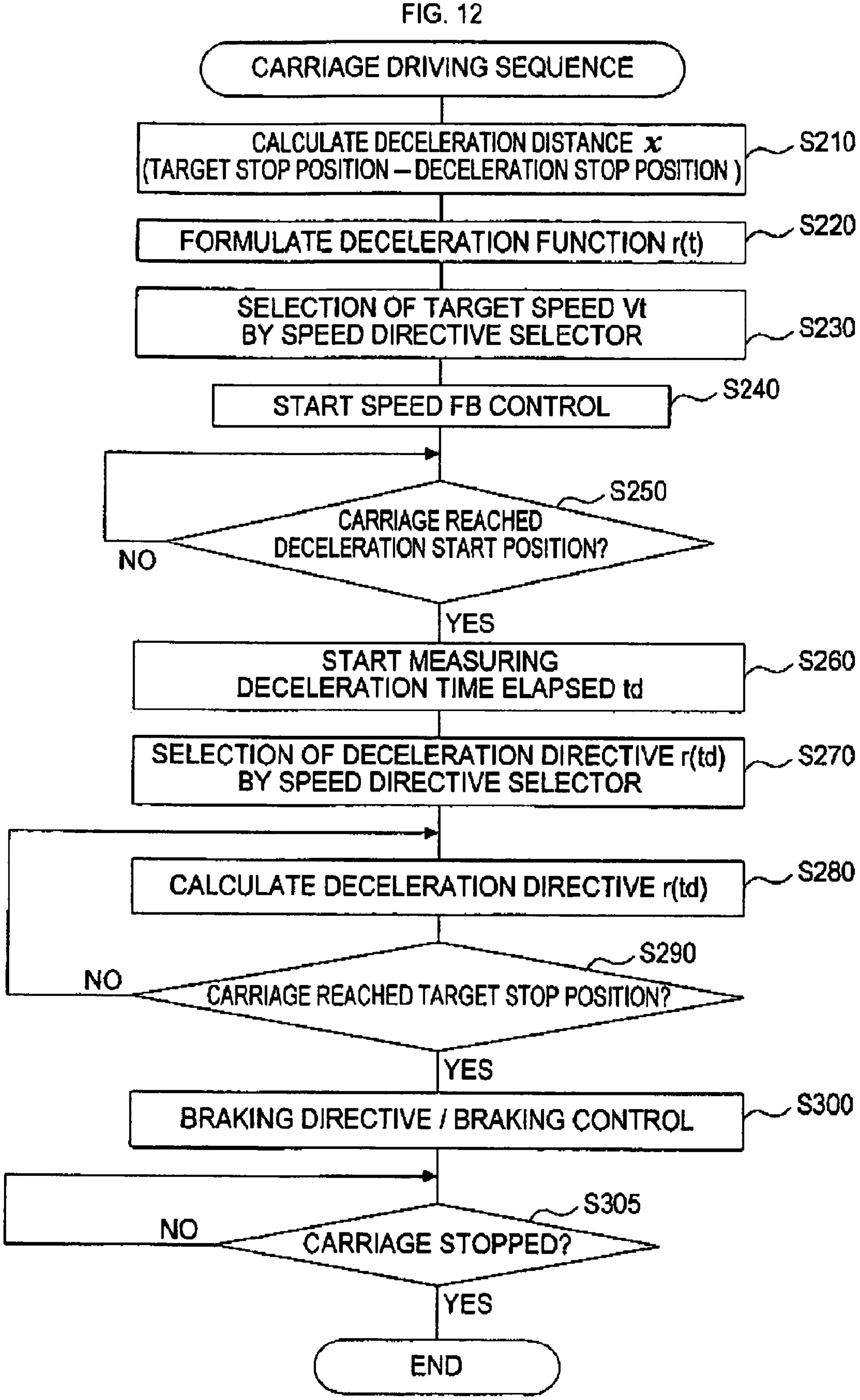
FIG. 12 is a flowchart showing steps in a carriage driving sequence performed by an ASIC.

Now, explanation is given, by way of FIG. 12, on how the motor controller 37 of the ASIC 33 generates the manipulated variable u after the ASIC 33 is started by the CPU 32 through the CR scanning process of FIG. 11. The motor controller 37 is configured as a so-called hardware circuit to perform the following control operation. However, the control operation as the hardware circuit is herein replaced with a flowchart for the purpose of facilitating understanding.

First of all, a difference between the target stop position and the deceleration start position which are set in the register group 35 is calculated to obtain the deceleration distance x from the deceleration start position to the target stop position (S210). Then, the deceleration function r(t) is formulated using the calculated deceleration distance x and the target speed $V_t$ set in the register group 35 (S220). The steps of S210 and S220 are performed by the deceleration function formulator 41. The particular method for formulating the deceleration function r(t) is already described above.

After the formulation of the deceleration function r(t), the target speed $V_t$ set in the target speed setting register 53 is selected by the switch 73 of the speed directive selector 71 (S230). Then, the speed feedback control by the speed feedback controller 75 is started (S240).

The ASIC 33 stands by until the carriage 5 reaches the deceleration start position (S250). When the carriage 5 has reached the deceleration start position (S250: YES), the timer 42 starts to measure the elapsed time td (S260). The deceleration directive r(td) from the deceleration directive generator 40 is selected by the switch 73 of the speed directive selector 71 (S270). Then, calculation of the deceleration directive r(td) is started by the deceleration directive calculator 43 (S280). The deceleration directive r(td) according to the elapsed time td at the time is inputted to the motor controller 37 per predetermined time interval.

When the carriage 5 has reached the target stop position (S290: YES), operation of the deceleration directive generator 40 is stopped even if the deceleration directive r(td) is still a finite value, and the manipulated variable (braking directive) for stopping the carriage 5 is outputted from the speed feedback controller 75 (S300). That is, a braking control for promptly stopping the carriage 5 is performed. When the carriage 5 is completely stopped (S305: YES), the carriage driving sequence is concluded.

(5) Effects

As noted above, the carriage control device 30 according to the present embodiment does not use a position feedback control for controlling the deceleration period after the carriage 5 has reached the deceleration start position. Instead, the deceleration directive r(td) corresponding to the elapsed time td since the start point of the deceleration period is calculated simply according to the deceleration function r(t) to perform the speed feedback control based on the obtained deceleration directive r(td).

Accordingly, reacceleration of the carriage 5 can be inhibited while the carriage 5 is being decelerated during the deceleration period. Furthermore, it is possible to prevent generation of noise which may result from the reacceleration (i.e., unstable speed change from deceleration to acceleration and again to deceleration, for example).

Additionally, the deceleration function r(t) is formulated as a quadratic function having a graph opening upward. Therefore, after the carriage 5 has reached the deceleration start position, the deceleration directive drops rapidly (in a steep slope), and then the slope becomes gradually gentle to be most gentle (almost vanish) at the time of complete stop of the carriage 5. Accordingly, the carriage 5 can be stopped at a stable state and speed.

The deceleration function r(t) is formulated of which integration value from the start of deceleration to the stop of the carriage 5 is consistent with the deceleration distance x. Thereby, the carriage 5 stops at the target stop position or in the vicinity thereof when the deceleration directive has become zero (0). Accordingly, the driving control device 30 can be achieved which has high precision in stopping the carriage 5.

Moreover, when the carriage 5 has reached the target stop position during deceleration control, operation of the deceleration directive generator 40 is stopped and a braking control is performed to promptly stop the carriage 5. Accordingly, the carriage 5 can stop at a target stop position with high precision.

According to the ink-jet printer of the present embodiment, reacceleration of the carriage 5 is inhibited during the deceleration period from the start of deceleration to the stop of the carriage 5. Accordingly, noise owing to looseness in mechanisms can be prevented during reciprocation of the carriage 5. A noiseless printer can be achieved without operation sounds.

(6) Variations

Figure 13:
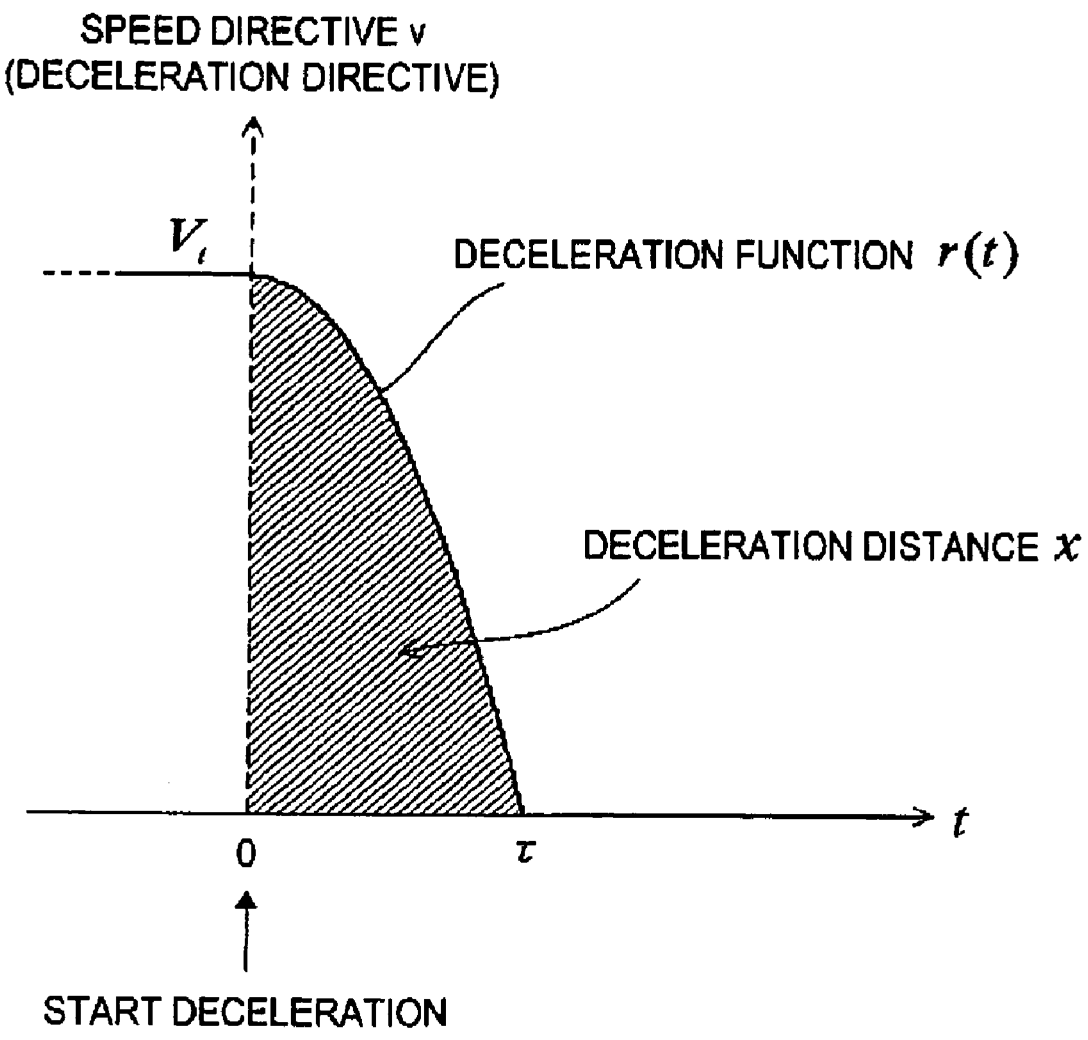
FIG. 13 is a diagram for explanation on a variation of the deceleration function r(t) (quadratic function having a graph opening downward)

In the above embodiment, the deceleration function r(t) is a quadratic function having a graph opening upward. However, it is also possible to formulate a quadratic function having a graph opening downward, for example. Formulation of such a quadratic function is particularly explained by way of FIG. 13. As shown in FIG. 13, if the deceleration function r(t) is expressed as a quadratic function having a graph opening downward, the quadratic function has a maximum value $V_t$ when t=0.

Accordingly, the function r(t) can be expressed as follows.

$$r(t)=-At^2+V_t \tag{6}$$

where A is a proportional constant.

Since the above deceleration function passes a point (t, 0), the formula (6) can be expressed as follows.

$$A\tau^2=V_t \tag{7}$$

On the other hand, since the deceleration distance x is known, and the deceleration distance x is consistent with the value obtained by integrating the deceleration function r(t) from the time t=0 to τ, another formula can be obtained as below.

$$x=\int_0^{\tau}(-At^2+V_t)\,dt=\left(-\frac{1}{3}A\tau^2+V_t\right)\tau \tag{8}$$

From the above formulas (7) and (8), τ and A can be obtained. As a result, the deceleration function r(t) is obtained as below.

$$r(t)=-\frac{V_t}{\tau^2}t^2+V_t,\qquad \tau=\frac{3x}{2V_t} \tag{9}$$

The deceleration function r(t) obtained from the above formula (9) also prevents reacceleration of the carriage 5 during the deceleration period as well as generation of noise by the carriage 5.

In the above, the cases are explained in which the deceleration function r(t) is expressed as a quadratic function. However, the deceleration function r(t) may be a linear function, a cubic or higher dimensional function, or a cosine function.

That is, any function may be used as long as the function does not cause reacceleration of the carriage 5 during the deceleration period. Particularly, any function is included which monotonically decreases from the deceleration start position until the deceleration directive becomes zero (0) and of which derivative is a monotonically decreasing or increasing function or a constant.

The monotonic decrease or increase herein should be broadly interpreted.

Accordingly, for example, in order to formulate the deceleration function r(t) as an n-degree function (n: even number) having a graph opening upward, including the quadratic function having a graph opening upward explained above, firstly the deceleration function r(t) may be expressed as follows, $$r(t)=A(t-\tau)^n \tag{10}$$

As a result of calculations performed in the same manner as above, the deceleration function r(t) can be expressed as follows.

$$r(t) = \frac{V_t^{n+1}}{\{(n+1)x\}^n}\left\{t - \frac{(n+1)x}{V_t}\right\}^n \tag{11}$$

That is, in the case of expressing the deceleration function r(t) as an even-number-degree function having a graph opening upward, the above formula (11) can be used.

Also, in order to formulate the deceleration function r(t) as an even-number-degree function or an odd-number-degree function having a graph opening downward, including the quadratic function having a graph opening downward explained above, firstly the deceleration function r(t) may be expressed as follows.

$$r(t) = -At^n + V_t \tag{12}$$

As a result of calculations performed in the same manner as above, the deceleration function r(t) can be expressed as follows.

$$r(t) = -\frac{V_t}{\tau^n}t^n + V_t, \qquad \tau = \frac{(n+1)x}{nV_t} \tag{13}$$

That is, in the case of expressing the deceleration function r(t) as an even-number-degree function or an odd-number-degree function having a graph opening downward, the above formula (13) can be used.

In the above embodiment, use of a quadratic function as the deceleration function r(t) is preliminarily determined. However, the carriage control device 30 may be designed such that what type of function is formulated by the deceleration function formulator 41 can be externally selected. For instance, a register for setting a type of function may be provided in the register group 35. A function of the type corresponding to a value in the register may be formulated by the deceleration function formulator 41.

None of these functions has a slope which becomes temporarily gentle and is then restored to its former state, like the speed directive v as shown in FIG. 10.

Second Embodiment

Now, an embodiment is described which allows continuation of a smooth speed change of the carriage 5 as well as reduction of a design load of a feedback controller.

(1) Speed Feedback Control of Carriage

Figure 14:
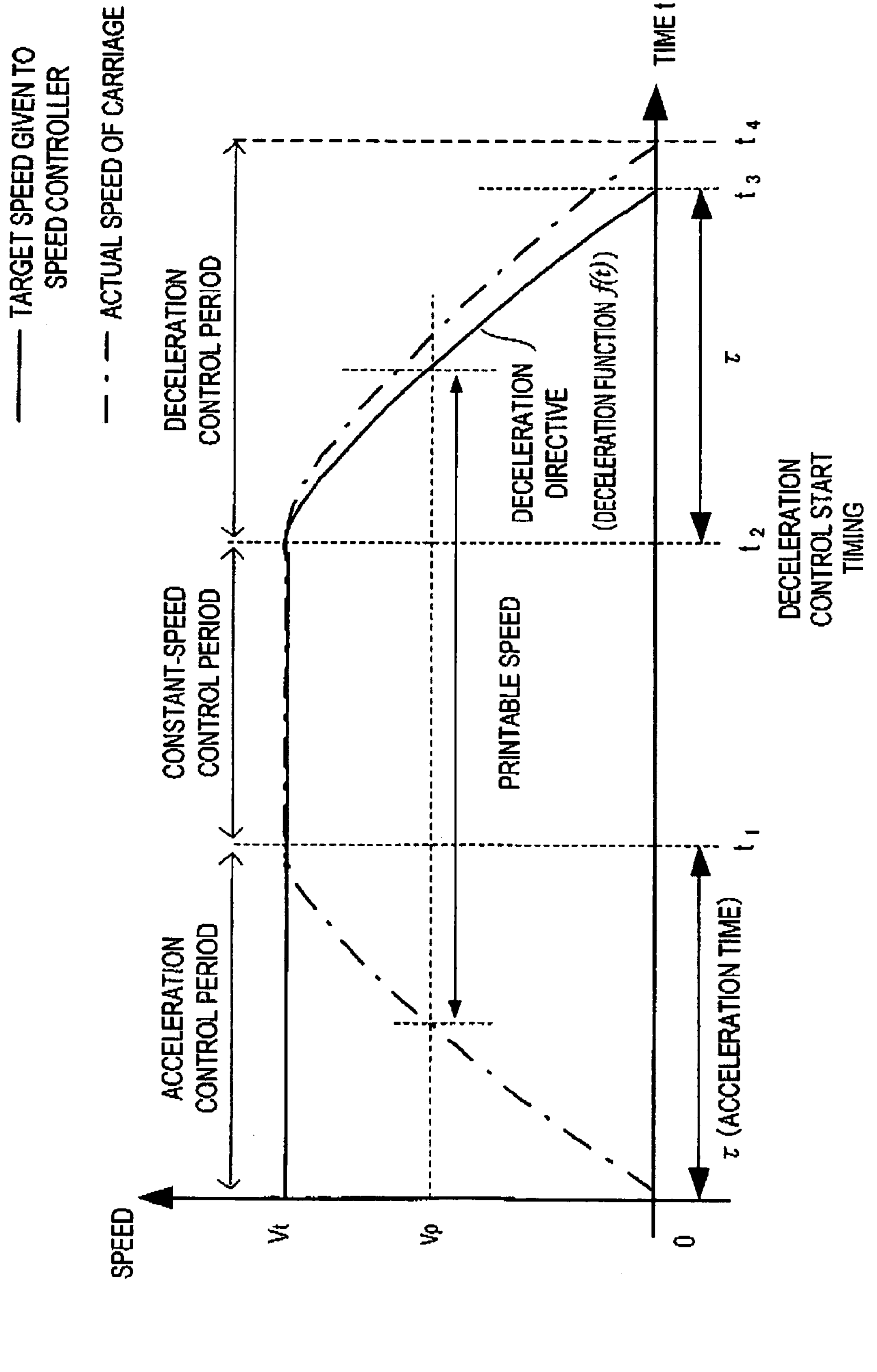
FIG. 14 is a graph showing transition in speed of a carriage according to a second embodiment.

In the multi functional apparatus 1 according to the present embodiment, the carriage 5 reciprocates in the main scanning direction. More particularly, the drive of the carriage 5 is controlled by a speed feedback control. That is, as shown in FIG. 14, when a print process (i.e., drive of the carriage) is started (t=0), the carriage 5 is started from a stopped state and gradually accelerated to reach a predetermined target constant speed $V_t$ (t=t1). After the carriage 5 continues to be driven at the target constant speed $V_t$ for a certain time (until t=t2), the carriage 5 starts to be decelerated to stop (t=t4). The drive of the carriage 5 in one direction is completed.

During an acceleration control period from the carriage 5 starts to be driven until the carriage 5 reaches the target constant speed $V_t$ and during a constant speed control period in which the carriage 5 is driven at the target constant speed $V_t$, the target constant speed $V_t$ is used as a target speed inputted to the speed feedback controller 75 (see later-explained FIG. 16) which performs a speed feedback control. That is, the speed feedback control is performed such that the actual speed of the carriage 5 is consistent with the target constant speed $V_t$.

On the other hand, after the constant speed drive of the carriage 5 during a deceleration control period from a deceleration control start timing at which a deceleration control is started until the carriage 5 is stopped, a deceleration directive obtained from a deceleration function f(t) of time elapsed from the deceleration control start timing is used as the target speed inputted to the speed feedback controller 75. The deceleration function f(t) is a function which continuously decreases from the target constant speed $V_t$ at the deceleration control start timing as well as monotonically decreases until the deceleration directive becomes zero (0), and of which derivative is a monotonic function or a constant. A deceleration directive time (t=t2 to t3) during which the deceleration directive changes from $V_t$ to zero (0) is equal to an acceleration time τ which is a period length of the acceleration control period. The function f(t) is formulated in the same manner as in the first embodiment.

According to the present embodiment, over the whole driving period during from the start to stop of the carriage 5, a position feedback control (based on a difference between the actual position of the carriage 5 and the target position) is not performed. The speed feedback control is simply performed in which the target speed is the target constant speed $V_t$ which is a constant or the deceleration directive based on the monotonically decreasing deceleration function f(t).

In the drive of the carriage 5 toward one side in the main scanning direction, image recording onto the recording paper P by the recording head 4 is started if the speed of the carriage 5 is not less than a predetermined printable speed Vp when the carriage 5 has reached a given printing start position during the acceleration. Printing continues until the carriage 5 reaches a given print ending position. That is, printing is performed if the speed of the carriage 5 is not less than the printable speed Vp even during the acceleration control period and the deceleration control period. To put it the other way around, the speed of the carriage 5 at the printing start position is already not less than the printable speed Vp even during the acceleration control period, and the speed of the carriage 5 at the print ending position is still not less than the printable speed Vp even during the deceleration control period. The speed feedback control of the carriage 5 is performed in this manner.

There may be cases in which printing in one direction is not completed (the carriage 5 has not yet reached the print ending position) even if the speed of the carriage 5 has become lower than the printable speed Vp during the deceleration control period. Such cases will be discussed later.

(2) Structure of Carriage Control Device

Figure 15:
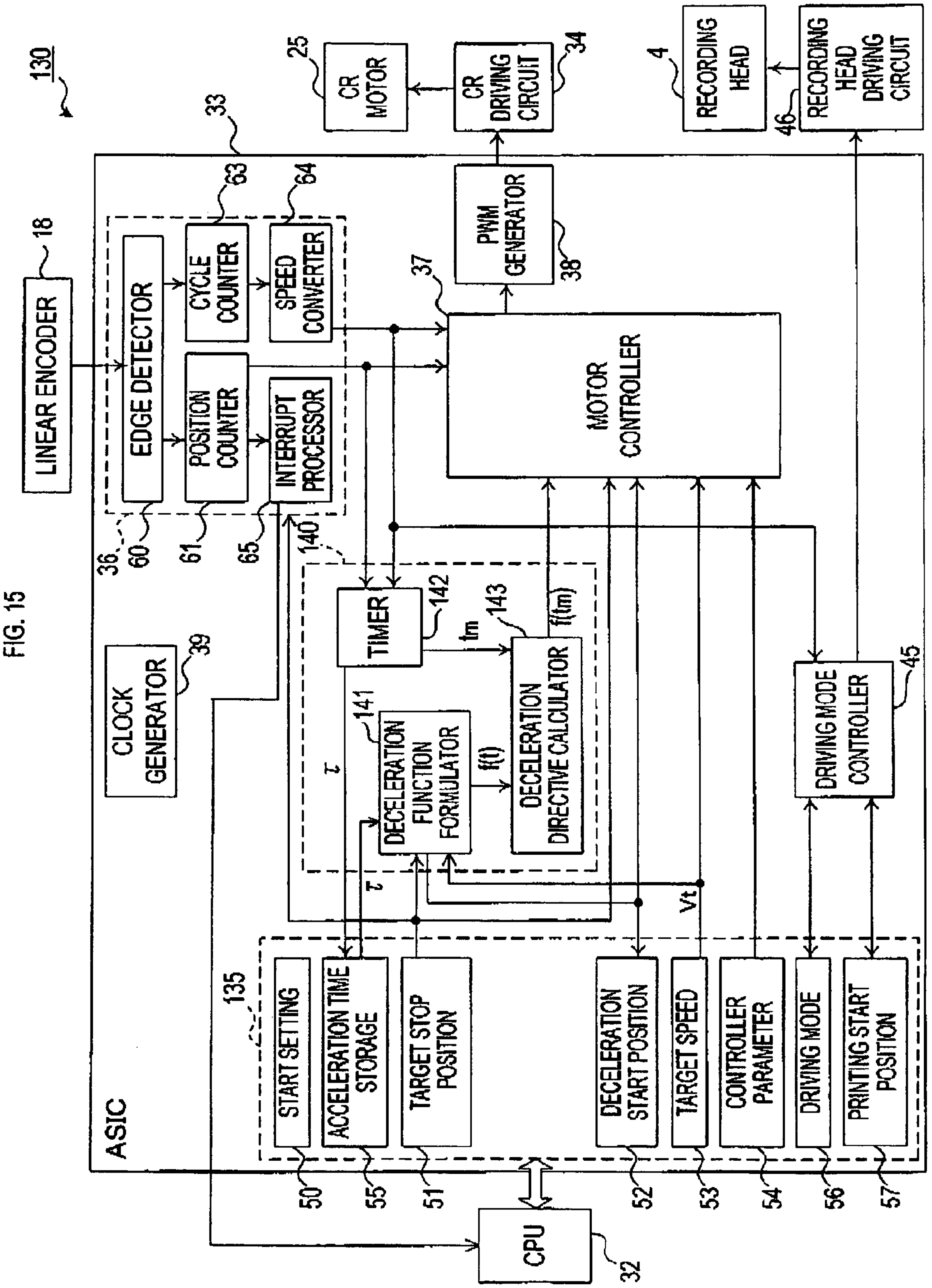
FIG. 15 is a block diagram showing a schematic structure of a carriage control device according to the second embodiment.

A structure of a carriage control device 130 for controlling the drive of the CR motor 25 (and the drive of the carriage 5) and the drive of the recording head 4 is explained by way of FIG. 15. The carriage control device 130 shown in FIG. 15 has a structure similar to the carriage control device 30 shown in FIG. 5. Therefore, the same reference numbers are given to the same components and explanation on the same components is not repeated. Hereinafter, only the difference is described.

A register group 135 includes the start setting register 50, the target stop position setting register 51, the deceleration start position setting register 52, the target speed setting register 53, the controller parameter setting register 54, an acceleration time storage setting register 55 which stores the acceleration time τ which is a period length of the acceleration control period, a driving mode setting register 56 which is used to set a driving mode, and a printing start position setting register 57 which is used to set the printing start position each time the carriage 5 travels in one direction.

Four types of driving modes are provided to set to the driving mode setting register 56, dependently on the actual speed of the carriage 5. The four driving modes are an "acceleration" mode in which the carriage 5 is accelerated to the printable speed Vp, a "deceleration" mode in which the carriage 5 is decelerated and the speed of the carriage 5 falls below the printable speed Vp, a "print" mode in which the speed of the carriage 5 is not less than the printable speed Vp, and a "stop" mode in which the carriage 5 is in a stopped state.

Relation among the encoder signal ENC 1 and ENC 2, the count value of the position counter 61, the count value of the cycle counter 63, and the edge detection signal is the same as in FIG. 3 according to the first embodiment.

Figure 16:
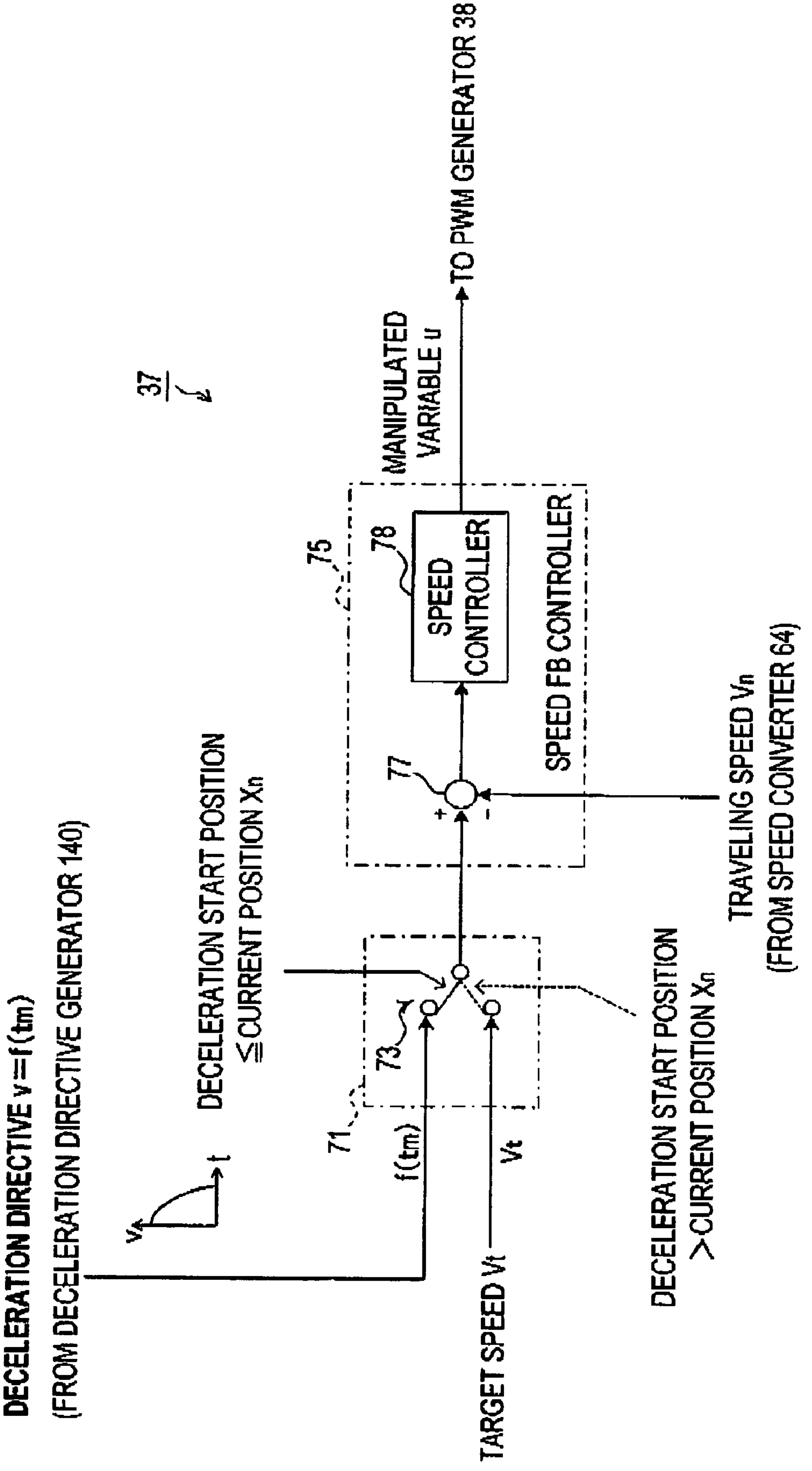
FIG. 16 is a block diagram showing a structure of a motor controller inside the motor control device according to the second embodiment.

As shown in FIG. 16, the motor controller 37 includes the speed directive selector 71 that selects one of the target constant speed $V_t$ set in the target constant speed setting register 53 and the deceleration directive f(tm) generated by a deceleration directive generator 140 to be outputted as a speed directive, and the speed feedback controller 75 that performs a speed feedback control such that the speed directive (one of the target speed $V_t$ and the deceleration directive f(tm)) received from the speed directive selector 71 is consistent with the traveling speed (actual speed) of the carriage 5 calculated by the speed converter 64 to generate a manipulated variable u.

In the motor controller 37, the speed directive selector 71 is designed to be switched between the target speed $V_t$ set in the target speed setting register 53 and the deceleration directive f(tm) generated by the deceleration directive generator 40 by the switch 73. The switch 73 is shifted to the target speed $V_t$ side when the current position Xn of the carriage 5 determined by the count value of the position counter 61 is smaller than the deceleration start position set in the deceleration start position setting register 52, i.e., until the carriage 5 reaches the deceleration start position. The switch 73 is shifted into a position on the deceleration directive f(tm) side when the current position Xn of the carriage 5 is or larger than the deceleration start position set in the deceleration start position setting register 52, i.e., after the carriage 5 has reached the deceleration start position.

In the speed feedback controller 75, a difference between the speed directive received from the speed directive selector 71 and the traveling speed Vn of the carriage 5 from the speed converter 64 is calculated by the adder 77. Based on the result of the calculation, a control calculation is performed by the speed controller 78 so as to obtain the manipulated variable u. That is, until the carriage 5 reaches the deceleration start position, the speed feedback control is performed based on the target speed $V_t$, while after the carriage 5 has reached the deceleration start position, the speed feedback control is performed based on the deceleration directive f(tm).

The control in the speed controller 78 constituting the speed feedback controller 75 is more particularly an IP control during the acceleration control period and a robust control during the constant speed control period and the deceleration control period. That is, the speed controller 78 is designed and tuned (to set optimal values to various control parameters in the IP control) such that, during the acceleration control period, the speed of the carriage 5 is smoothly increased without high frequency components such as overshoot in the speed change and reaches with continuity the target constant speed $V_t$. The speed controller 78 is designed and tuned such that, even during the constant speed control period and the deceleration control period, there is no high frequency component in the speed change and the speed of the carriage 5 continuously changes (decreases) in transition (speed change) from a constant speed state to a deceleration state.

As shown in FIG. 15, the deceleration directive generator 140 which generates the deceleration directive f(tm) in an ASIC 133 includes a deceleration function formulator 141 that formulates a deceleration function f(t) from which the deceleration directive is generated, a timer 142 that measures time elapsed tm since the carriage 5 has reached the deceleration start position, and a deceleration directive calculator 143 that calculates the deceleration directive f(tm) at the elapsed time tm using the deceleration function f(t).

Figure 17:
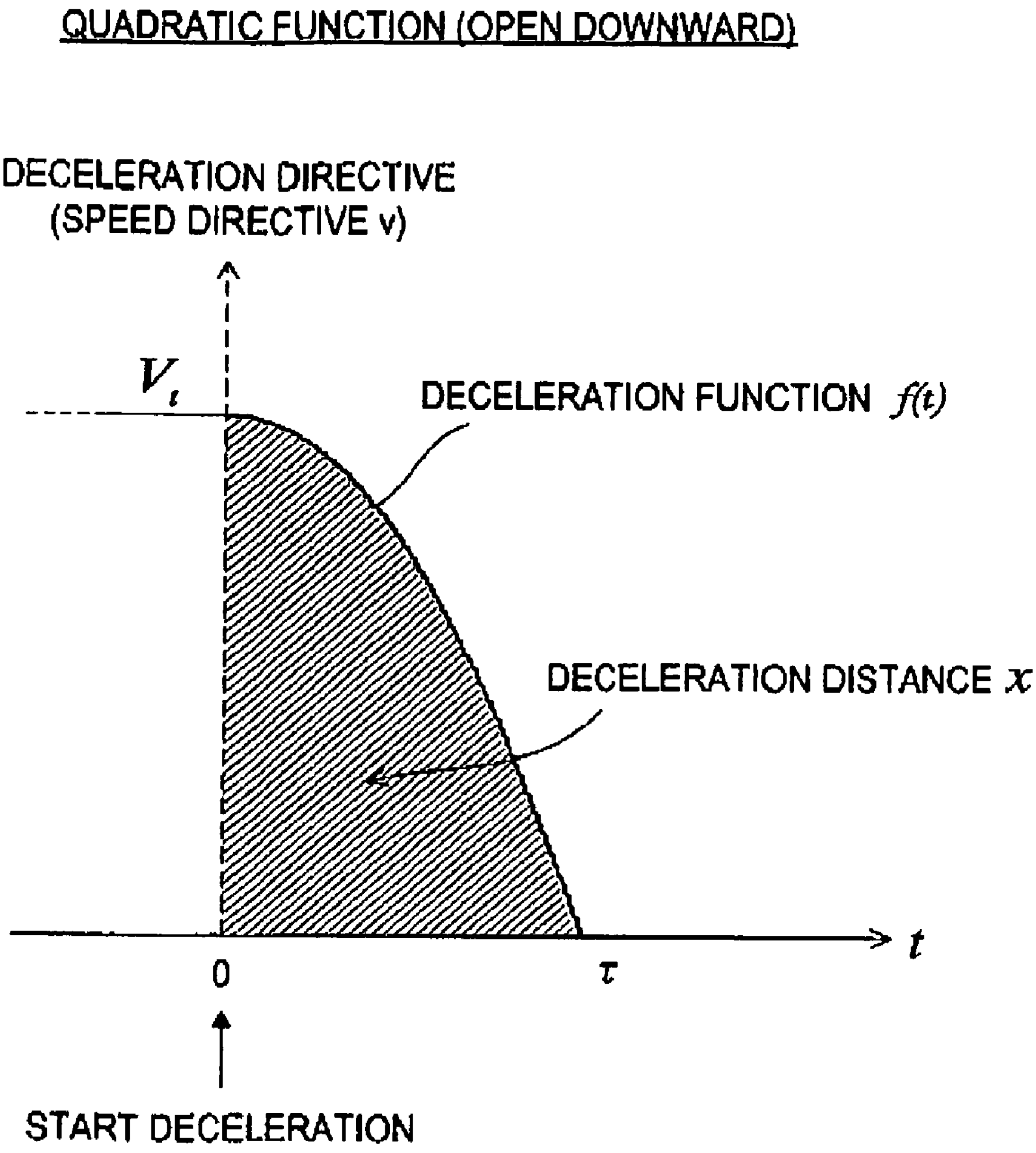
FIG. 17 is a diagram for explanation on a deceleration function f(t) expressed by a quadratic function having a graph opening downward.

A deceleration function formulator 141 in the present embodiment is designed to formulate a quadratic function having a graph opening downward as shown in FIG. 17 as the deceleration function f(t). As later explained, the deceleration function f(t) is formulated every time the carriage 5 is driven, that is, each time the carriage 5 travels to one of the sides in the main scanning direction. The formulation is based on the target constant speed $V_t$ and the acceleration time τ set in the register group 135.

Formulation of the deceleration function f(t) by the deceleration function formulator 141 is performed in the same manner as in the first embodiment. Accordingly, only the formulas are shown below and explanation thereof is not repeated.

$$f(t) = -At^2 + V_t \tag{21}$$

$$A\tau^2 = V_t \tag{22}$$

$$f(t) = -\frac{V_t}{\tau^2}t^2 + V_t \tag{23}$$

$$x = \int_0^{\tau}\left(-\frac{V_t}{\tau^2}t^2 + V_t\right)dt \tag{24}$$

The deceleration function f(t) continuously decreases (monotonically decreases) from the target constant speed $V_t$ at the deceleration start timing, and its derivative df(t)/dt is also a monotonic (monotonically increasing or decreasing) function.

After the deceleration function f(t) is formulated by the deceleration function formulator 141, the deceleration directive f(tm) at the elapsed time tm is calculated by the deceleration directive calculator 143 using the deceleration function f(t). As a result, when deceleration of the carriage 5 is started after the carriage 5 has reached the deceleration start position, the deceleration directive f(tm) is gradually decreased to zero (0) along the waveform of the deceleration function f(t) shown in FIG. 17.

Figure 18A:
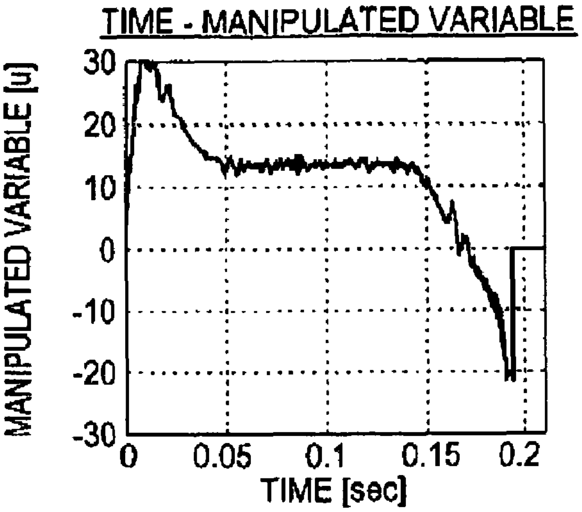
FIGS. 18A to 18C are graphs respectively showing relation between time and a manipulated variable, position and speed, and time and speed when a speed feedback control of the carriage is performed.
Figure 18B:
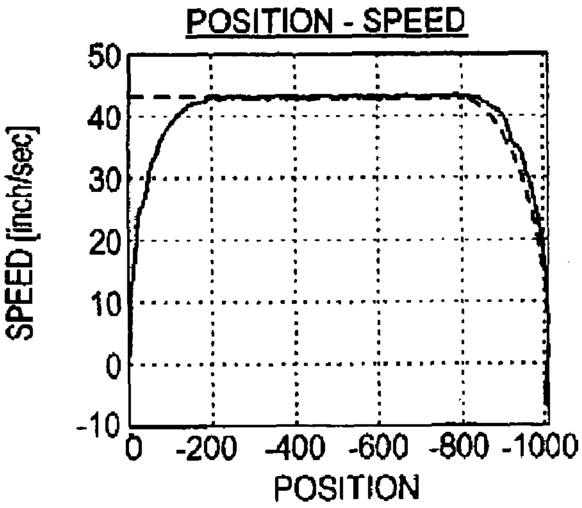
Figure 18C:
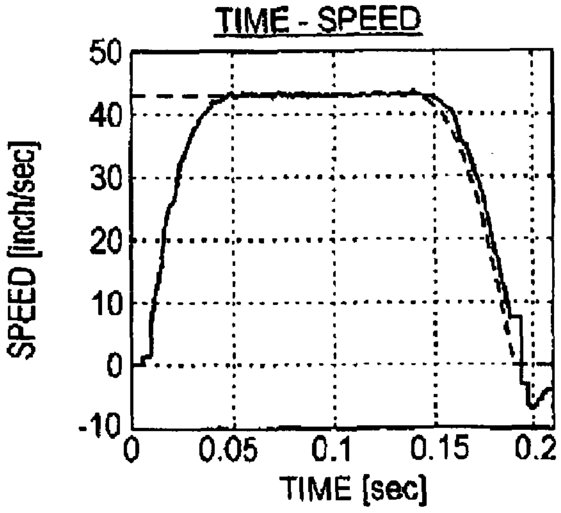

FIGS. 18A to 18C respectively show a change in the manipulated variable u and the actual speed of the carriage 5, when the speed feedback control of the carriage 5 is performed based on the target constant speed $V_t$ and the deceleration directive f(tm). FIG. 18A shows the change in the manipulated variable u with respect to time (time elapsed from the start of the drive of the carriage 5), FIG. 18B shows the change in the actual speed of the carriage 5 with respect to its position, and FIG. 18C shows the actual speed of the carriage 5 with respect to the time elapsed from when the carriage 5 starts to be driven. In FIGS. 18A to 18C, the acceleration time $\tau$ is set as the time until the actual speed of the carriage 5 reaches n % (99% in the present embodiment) of the target constant speed $V_t$.

As is clear from FIGS. 18A to 18C, the speed change of the carriage 5 is generally smooth with high frequency components being suppressed in the speed zone other than zones immediately after the carriage 5 starts to be driven and immediately before the carriage 5 is stopped where an irregular speed change can be seen. Accordingly, the speed of the carriage 5 is smoothly shifted during printing onto the recording paper P (e.g., when the speed of the carriage 5 is not less than 30 [inch/sec]). Printing with high precision can be achieved.

The actual speed of the carriage 5 is suddenly dropped approximately past the time t=0.18[sec]. This is because the carriage 5 has already reached the target position at this timing and triggered a later-explained braking control, and also because the travel distance until the carriage 5 is completely stopped by the braking control is so little as to be detected by the linear encoder 18.

(3) Process Performed in CPU and ASIC

The CR scanning process performed by the CPU 32 is the same as in FIG. 11, and thus explanation thereof is not repeated.

Figure 19:
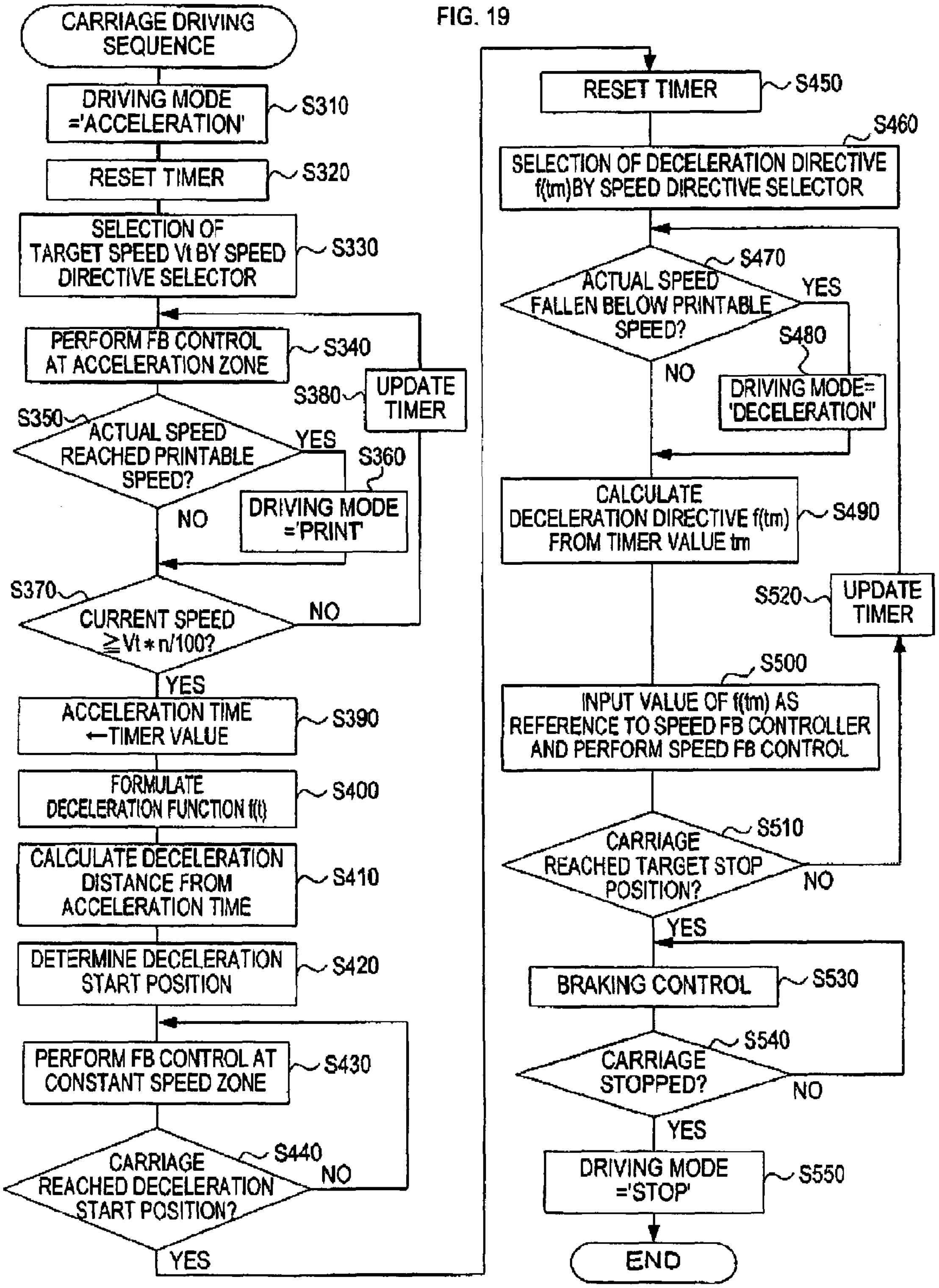
FIG. 19 is a flowchart showing steps in a carriage driving sequence performed by an ASIC according to the second embodiment.

Now, explanation is particularly given, by way of FIG. 19, on the speed feedback control performed by the motor controller 37 of the ASIC 133 after the ASIC 133 is started by the CPU 32 through the CR scanning process. The motor controller 37 is configured as a so-called hardware circuit to perform the following control operation. However, the control operation as the hardware circuit is herein replaced with a flowchart for the purpose of facilitating understanding.

Firstly, the "acceleration" mode is set to the driving mode setting register 56 as the driving mode (S310). The timer 42 is reset (S320). The target constant speed $V_t$ is selected by the speed directive selector 71 inside the motor controller 37 as the target speed to be inputted to the speed feedback controller 75 (S330). The speed feedback control at the time of acceleration is started by the speed feedback controller 75 (S340).

After the start of acceleration, it is determined whether the actual speed of the carriage 5 has reached the printable speed Vp (S350). It negatively determined (S350: NO), it is further determined whether the current speed is not less than n % of the target constant speed $V_t$ (S370).

That is, the acceleration time $\tau$ from the start of the carriage 5 until the carriage 5 reaches the target constant speed $V_t$ is not defined strictly as the time until the actual speed reaches the target constant speed $V_t$ but defined as the time until the actual speed reaches n % ($90 \leqq n < 100$) of the target constant speed $V_t$. In other words, the carriage 5 is considered to have shifted to a constant speed state when the actual speed becomes close to the target constant speed $V_t$. Thereby, the acceleration time $\tau$ is not measured unnecessarily long. Te deceleration control period is not likely to be set unnecessarily long as well. Sufficient constant speed control period can be secured. What value to be set to n way be arbitrarily determined depending on performance of the speed controller 78, so that the acceleration time $\tau$ is not estimated unnecessarily long.

The timer 142 is updated until the actual speed of the carriage 5 reaches n % or more of the target constant speed $V_t$ (S380). During that time, if the actual speed reaches the printable speed Vp (S350: YES), the "print" mode is set to the driving mode setting register 56 as the driving mode (S360). Thereby, the carriage 5, although it is still being accelerated, is considered to have entered a speed zone in which printing can be performed onto the recording paper P.

When the actual speed of the carriage 5 reaches n % or more of the target constant speed $V_t$ (S370: YES), the value in the timer 142 which has been updated is stored in the acceleration time storage setting register 55 as the acceleration time $\tau$ (S390). The deceleration function f(t) is formulated based on the stored acceleration time $\tau$ and the target constant speed $V_t$ (S400). The formulation of the deceleration function f(t) is performed as already described by the deceleration function formulator 141.

The deceleration distance x is calculated from the formulated deceleration function f(t) and the acceleration time $\tau$ using the formula (24) (S410). The deceleration start position is calculated in the already described manner based on the calculated deceleration distance x and the target stop position stored in the deceleration start position setting register 52 (S420). In this manner, the deceleration function f(t) from which the deceleration directive is generated and the deceleration start position where deceleration is started are obtained.

Then, the carriage 5 enters to the constant speed control period during which the speed of the carriage 5 is controlled to the target constant speed $V_t$, and the speed feedback control is performed such that the speed of the carriage 5 is maintained at the target constant speed $V_t$ (S430). Meanwhile, it is determined whether the carriage 5 has reached the deceleration start position during the speed feedback control (S440). If positively determined (S440: YES), a timer 142 is reset (S450). The deceleration directive f(tm) is selected by the speed directive selector 71 so that the deceleration control period is started (S460). That is, this point of time is the deceleration start timing.

It is then determined whether the speed of the carriage 5 falls below the printable speed Vp (S470). The deceleration directive f(tm) corresponding the timer value tm (i.e., elapsed time from the deceleration start timing) is calculated using the deceleration function f(t) while the speed of the carriage 5 is not less than the printable speed Vp (S490). The value of the deceleration directive f(tm) is inputted to the speed feedback controller 75 as the target speed. The speed feedback control is performed (S500).

Subsequently, it is determined whether the carriage 5 has reached the target stop position (S510). While the timer value tm is updated until the carriage 5 reaches the target stop position (S520), the step of S470 and onwards are repeated. Meanwhile, if the actual speed of the carriage 5 has fallen below the printable speed Vp (S470: YES), the "deceleration" mode is set to the driving mode setting register 56 as the driving mode (S480).

When the carriage 5 reaches the target stop position (S510: YES), operation of the deceleration directive generator 140 is stopped even if the deceleration directive f(tm) is still a finite value. Also, the manipulated variable (braking directive) for stopping the carriage 5 is outputted from the speed feedback controller 75 (S530). That is, a braking control is performed to promptly stop the carriage 5. When the carriage 5 is completely stopped (S540: YES), the "stop" mode is set to the driving mode setting register 56 as the driving mode (S550). Then, the carriage driving sequence is completed, On the other hand, in parallel to the carriage driving sequence, a print determination sequence shown in FIG. 20 and a print termination determination sequence shown in FIG. 21 are performed. Hereinafter, these sequences are respectively described. The respective sequences are actually executed in a hardware circuit. However, in order to facilitate understanding, the sequences are explained using flowcharts.

Figure 20:
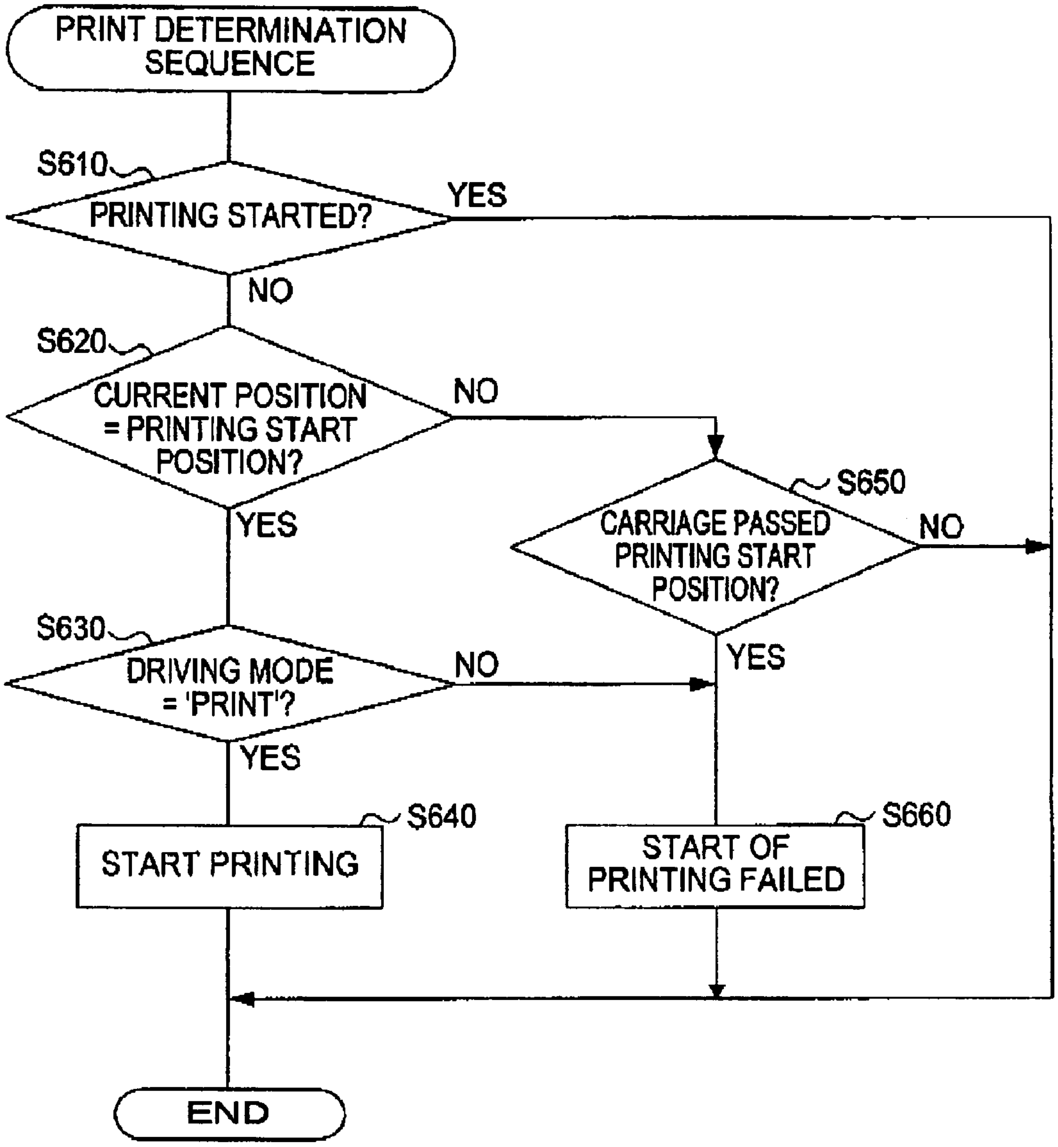
FIG. 20 is a flowchart showing steps in a print determination sequence performed by the ASIC.
Figure 21:
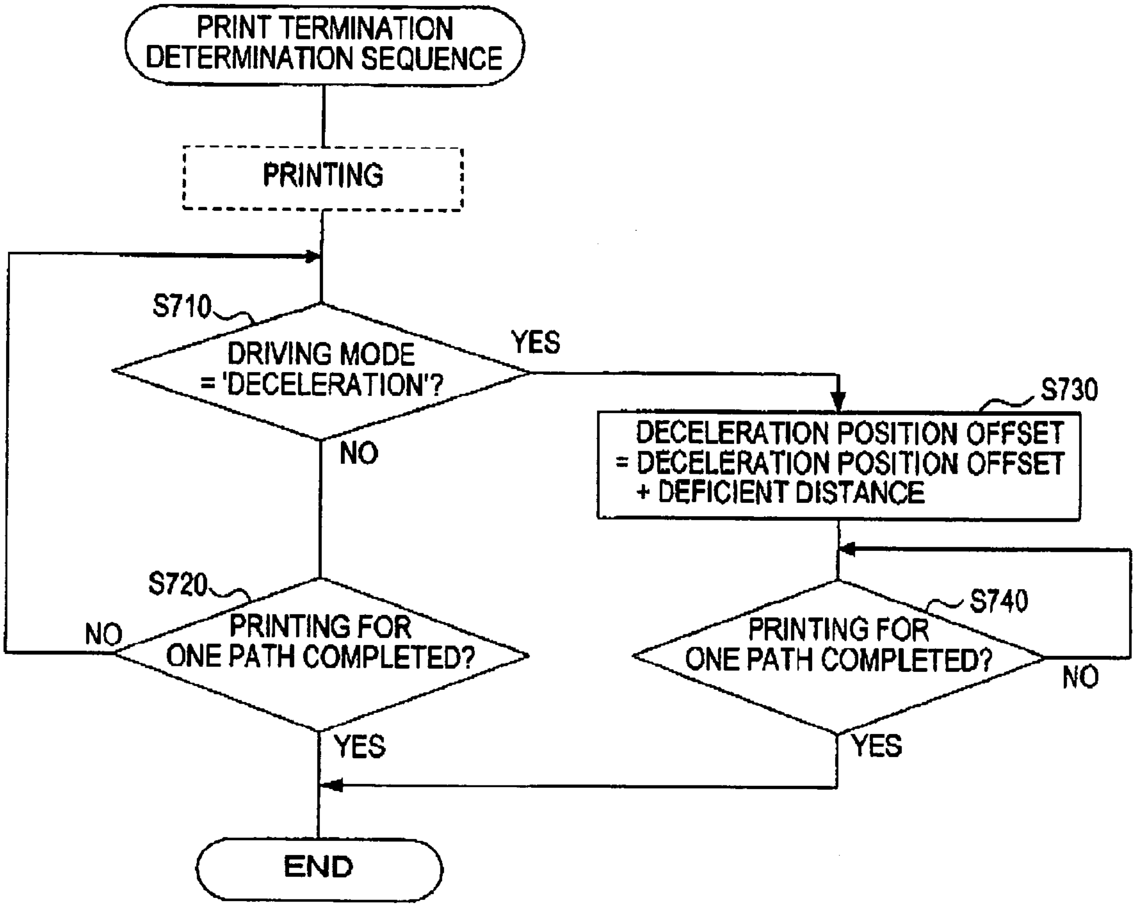
FIG. 21 is a flowchart showing steps in a print termination determination sequence performed by the ASIC.

Referring to FIG. 20, when the print determination sequence is started, it is determined whether printing has been started (S610). If printing has already been started, the sequence is ended. If not (S610: NO), it is determined whether the current position of the carriage 5 is at the printing start position (S620). If the carriage 5 is not at the printing start position (S620: NO), and has not passed the printing start position (S650: NO), the sequence is ended. If the carriage 5 has already passed the printing start position (S650: YES), a predetermined process such as giving warning is performed which is conducted when the start of the printing has failed (S660). The sequence is ended.

When the carriage 5 has reached the printing start position (S620: YES), it is determined whether the "print" mode is set as the driving mode (S630). If positively determined (S630: YES), a print process onto the recording paper P is started (S640). Otherwise (S630: NO), the process in S660 is performed since the speed of the carriage 5 has not reached the printable speed Vp although the carriage 5 has reached the printing start position.

On the other hand, if the print process is started, the print termination determination sequence shown in FIG. 21 is performed. That is, firstly it is determined whether the driving mode is the "deceleration" mode (S710). If the speed of the carriage is still not less than the printable speed Vp and the driving mode is the "print" mode (S710: NO), it is determined whether printing for one path has completed (S720). If printing for one path is not completed (S720: NO), the process returns to S710. If printing for one path has been completed (S720: YES), this sequence is ended.

If the driving mode is the "deceleration" mode even if printing for one path is not completed (S710: YES), the speed of the carriage 5 is considered to have fallen below the printable speed Vp during the printing. In this case, the printing itself is continued. However, necessary steps are taken so that printing is ended before the speed of the carriage 5 falls below the printable speed Vp the next time when the carriage is driven (print process is performed). Particularly, a deficient distance xd is added to a deceleration position offset $X_{off}$ (S730).

The deficient distance xd is a distance between the position where the driving mode is switched to the "deceleration" mode and the position where printing is expected to be terminated. In other words, it is a distance the carriage 5 travels from the position where the speed of the carriage 5 has fallen below the printable speed Vp to the position where the printing is terminated. The deficient distance xd is added to the deceleration position offset $X_{off}$ at the time to generate a new deceleration position offset $X_{off}$.

It is possible to reflect the deceleration position offset $X_{off}$ the next time when the carriage 5 is driven. Particularly, the measured acceleration time τ is not used as is as the deceleration directive time when formulating the deceleration function f(t). The time corresponding to the aforementioned deceleration position offset $X_{off}$ is added to the measured acceleration time τ to generate a new acceleration time τm. The deceleration function f(t) is formulated using the acceleration time τm as the deceleration control time.

The new acceleration time τm to which the deceleration position offset $X_{off}$ is added is obtained as follows.

$$\tau_m = \tau + \frac{3}{2V_t} X_{off} \tag{25}$$

From the above, the deceleration function f(t) is formulated based on the time τm which is longer than the actually measured acceleration time τ by the deceleration position offset $X_{off}$. Thereby, the time until the deceleration function f(t) becomes zero (0) is also increased, the time until the speed of the carriage 5 falls below the printable speed Vp becomes long, and printing can be terminated while the speed of the carriage 5 is not less than the printable speed Vp.

After the deceleration position offset $X_{off}$ is calculated in S730, it is determined whether printing for one path has been completed (S740) as in S720. The determination step in S740 is repeated until it is positively determined (S740: YES).

(4) Effects

In the above multi function apparatus 1 according to the second embodiment as well, the position feedback control based on the difference between the target position and the actual position is not used in the control of the drive of the carriage 5. Simply, the target constant speed $V_t$ is given as the target speed at the time of acceleration and constant speed drive. At the time of deceleration, the deceleration function f(t) is firstly obtained using the information at the time of acceleration (acceleration time τ). The deceleration directive f(tm) is calculated which corresponds to the time tm elapsed from the deceleration control start timing based on the deceleration function f(t). The speed feedback control is performed based on the deceleration directive f(tm). The deceleration function f(t) is a monotonically decreasing function, and its derivative is a monotonic function or a constant.

That is, it is not necessary to generate the speed directive to be inputted to the speed feedback controller 75 as a result of the position feedback control as before. Simply as above, the speed directive is the constant $V_t$ or the value based on the deceleration function f(t). Accordingly, there is not need for the position feedback control (control based on a difference between the target position and the current position of the carriage). Designing of a controller for the position feedback control is no longer necessary. There is reduction in load due to designing (tuning) of the controller for position feedback control of the drive of the carriage 5.

Moreover, the speed feedback control by an IP control according to the target constant speed $V_t$ is performed during acceleration and constant speed drive so as not to cause overshoot. The speed feedback control by a control (robust control in the present embodiment) in which the deceleration directive based on the deceleration function f(t) is performed during deceleration. Accordingly, the speed change during acceleration and deceleration becomes smooth, and the shift from acceleration to constant speed drive and the shift from constant speed drive to deceleration are performed with continuity. The speed change as a whole becomes smooth, resulting in that generation of high frequency components is inhibited. Consequently, ejection of ink from nozzles of the recording head 4 to a wrong spot on the recording paper P is reduced. Printing with high precision can be achieved.

Also in the present embodiment, the acceleration time τ until the speed of the carriage 5 reaches the target constant speed $V_t$ from when the carriage 5 starts to be driven is not set as the time until the actual speed of the carriage 5 reaches the target constant speed $V_t$, but as the time until the actual speed reaches n % ($90 \leqq n < 100$) of the target constant speed $V_t$. That is, the carriage 5 is regarded as being shifted to a constant speed state when the actual speed comes close to the target constant speed $V_t$. Accordingly, the acceleration time τ is not measured unnecessarily long. There is no fear that the deceleration directive time (acceleration time τ) is Bet unnecessarily long. A sufficient constant speed control period can be secured. In order to achieve favorable printing precision, it is more preferable that the printing during the constant speed drive is secured longer than the printing during acceleration or deceleration. Accordingly, the secured sufficient constant speed control period allows the printing precision to be more favorably maintained than before.

In addition, as noted in the printing termination determination sequence of FIG. 21, when the driving mode is shifted to the "deceleration" mode (i.e., speed of the carriage 5 falls below the printable speed Vp) even when the printing for one path has not yet completed, the travel distance of the carriage 5 (deficient distance xd) since the driving mode has shifted to the "deceleration" mode until the printing is terminated is reflected as the deceleration position offset $X_{off}$ next time the carriage driving control is performed. Accordingly, printing in which the speed of the carriage 5 is not less than the printable speed Vp can be ensured. More favorable printing precision can be maintained.

Furthermore, in the present embodiment, a quadratic function having a graph opening downward is used as the deceleration function f(t). Accordingly, compared to the case in using the other functions (such as a high dimensional function and a cosine function), the structure for formulating the deceleration function f(t) can be simplified. Also, a load in formulating such a deceleration function (calculation load) can be reduced.

[Variations]

In the second embodiment, the acceleration time τ until the carriage 5 reaches the target constant speed $V_t$ is not defined as the time until the actual speed definitely reaches the target constant speed $V_t$ but as the time until the actual speed reaches n % (90≦n<100) of the target constant speed $V_t$. To the contrary, however, the acceleration time τ may be strictly measured, and the deceleration directive time may be adjusted as required. That is, the acceleration time τ is set as the time until the actual speed of the carriage 5 definitely reaches the target constant speed $V_t$. The deceleration directive time is not set as the acceleration time τ as is but set as k % (90≦k<100) of the acceleration time τ.

That is, the time shorter than the actual acceleration time τ is set as the deceleration directive time, assuming that the actual acceleration time τ is estimated longer than necessary. The obtained deceleration directive time is used to formulate the deceleration function f(t). In this manner, the sufficient constant speed control period can be secured as in the second embodiment.

Furthermore, in addition that the acceleration time τ is set as the time until the actual speed reaches n % of the target constant speed $V_t$, the deceleration directive time may be set as k % of the acceleration time τ. In any way, the deceleration directive time may not be set unnecessarily long, and may correspond to time during which the carriage 5 is actually in an accelerated state, depending on performance of the speed controller 78.

Of course, if delay in the control system is very small and it is appropriate to set the actual time until the speed of the carriage 5 reaches the target constant speed $V_t$ as the acceleration time τ as is, the acceleration time τ may be set strictly as the time until the actual speed reaches the target constant speed $V_t$, instead of the time until the actual speed reaches n % of the target constant speed $V_t$.

In that case, the acceleration time τ may be used as the deceleration directive time as is to formulate the deceleration function f(t). However, in consideration of delay in the control system at the time of deceleration control, the deceleration directive time may be set as k % (90≦k<100) of the acceleration time τ.

Also in the speed feedback controller 75, the speed feedback control at the time of acceleration is performed by an IP control. However, the IP control is only an example. A PID control or other corresponding controls can be arbitrarily used as far as such controls do not allow high frequency components like overshoot to be included in the result of the control (actual speed response).

Furthermore, in the second embodiment, a quadratic function having a graph opening downward is used as the deceleration function f(t) from which a deceleration directive is generated. However, this is only an example. Any function can be used as the deceleration function f(t) as far as the function continuously decreases (monotonically decreases) from the target constant speed $V_t$ and its derivative is a monotonically decreasing or increasing function or a constant, such as a part of a graph of a monotonically decreasing cubic function which is monotonically decreasing toward the inflection point, or a part of a cosine function which is monotonically decreasing.

In consideration of simplifying the structure for formulating the deceleration function f(t) as much as possible, however, one of the most appropriate way is to use a quadratic function having a graph opening downward as in the above second embodiment.

Third Embodiment

In the above second embodiment, the deceleration directive f(tm) generated by the deceleration directive generator 140 is used as the speed directive (deceleration directive) in the deceleration control period. In the present embodiment, actual speed data of the carriage 5 during the acceleration control period is used as the deceleration directive instead. Since the other structure is the same as in the second embodiment, explanation thereof is not repeated. Hereinafter, generation of the deceleration directive in the deceleration control period is mainly explained.

(1) Structure of Carriage Control Device

Figure 22:
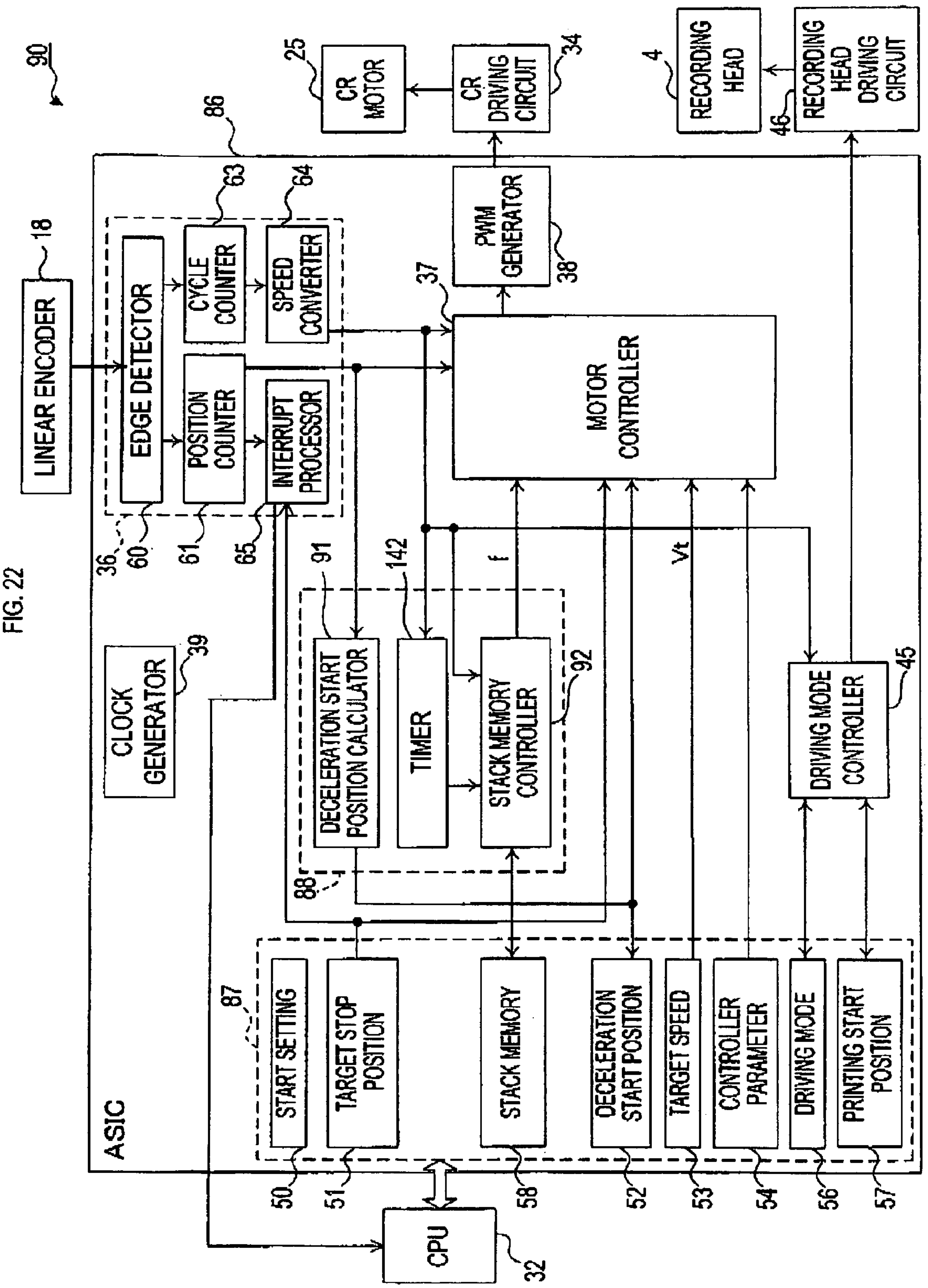
FIG. 22 is a block diagram showing a schematic structure of a carriage control device according to a third embodiment.

FIG. 22 shows a schematic structure of a driving control device 90 according to the third embodiment. As shown in FIG. 22, the carriage control device 90 is different from the carriage control device 130 in that a register group 87 includes a stack memory 58 instead of the acceleration time storage setting register 55, and that a deceleration directive generator 88 generates the deceleration directive based on data stored in the stack memory 58.

The actual speed data of the carriage 5 in the acceleration control period is stored on the stack memory 58 at a constant frequency Tm.

The deceleration directive generator 88 includes the timer 142, a stack memory controller 92 that sequentially stores the actual speed of the carriage 5 during the acceleration control period at the constant frequency Tm, and a deceleration start position calculator 91 that calculates the deceleration start position.

The deceleration start position calculator 91 calculates the travel distance of the carriage 5 during the acceleration control period based on the position of the carriage 5 at the start of the acceleration control period and the position of the carriage 5 at the end of the acceleration control period. The deceleration start position calculator 91 sets a position that is short from the target stop position by the calculated travel distance to the deceleration start position setting register 52.

The stack memory controller 92 sequentially inputs the data (actual speed data at the time of acceleration) stored in the stack memory 58 from the latest in order of storage (that is, from the largest actual speed data) at the above constant frequency Tm as a deceleration directive f. The deceleration directive f is the target speed to be inputted to the motor controller 37 after the carriage 5 has reached the deceleration start position and entered into the deceleration control period.

That is, the actual speed of the carriage 5 at the time of acceleration is used as the deceleration directive f at the time of deceleration. Accordingly, a locus of the actual speed at the time of acceleration is symmetrical to a locus of the deceleration directive at the time of deceleration.

(2) Process Performed in ASIC

Figure 23:
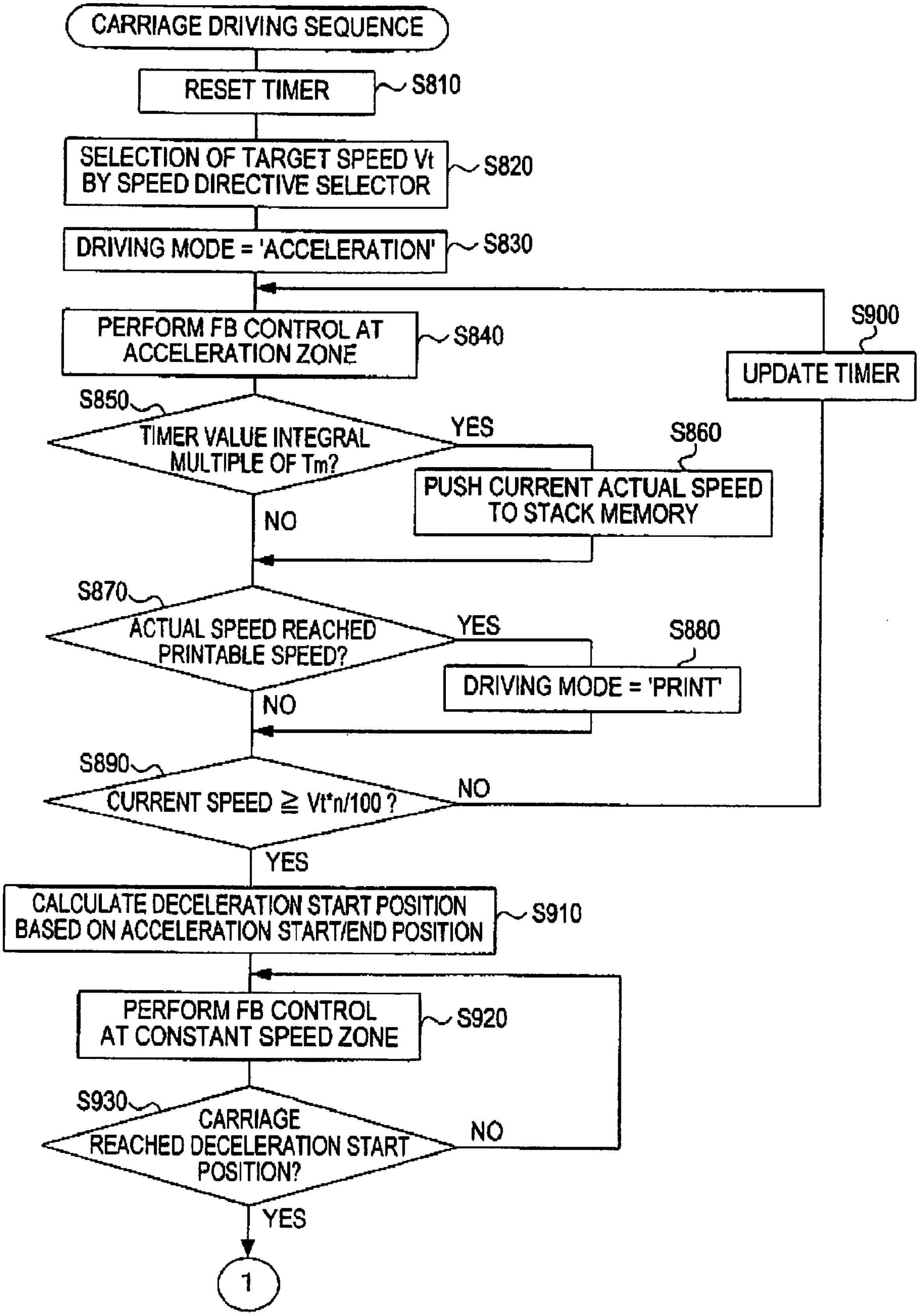
FIG. 23 is a flowchart showing (first half) steps in a carriage driving sequence performed by an ASIC according to the third embodiment.
Figure 24:
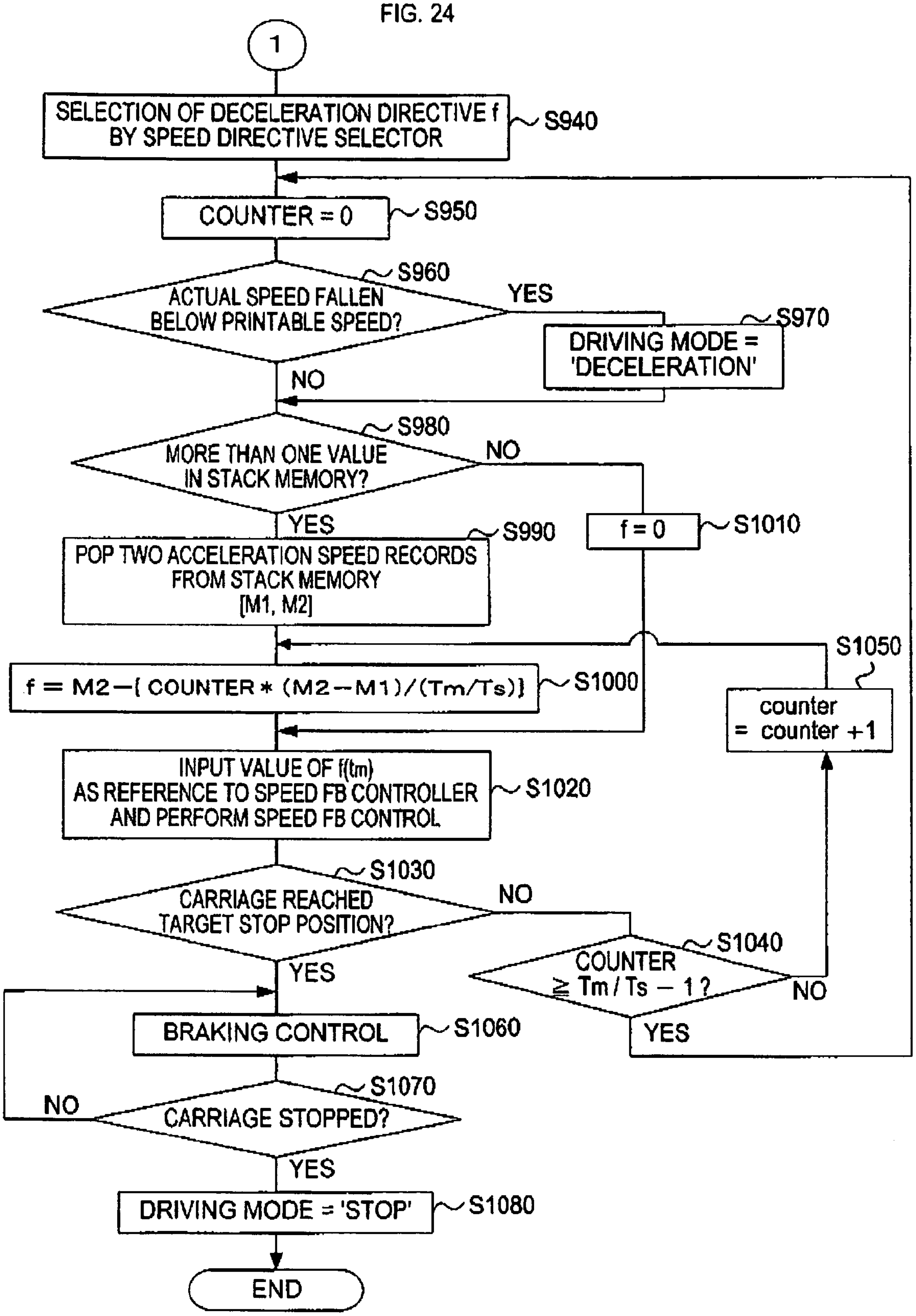
FIG. 24 is a flowchart showing (second half) steps in the carriage driving sequence performed by the ASIC according to the third embodiment.

Hereinafter, a carriage driving sequence according to the present embodiment is explained by way of FIGS. 23 and 24.

Firstly, the timer 142 is reset (S810). Subsequently, the speed directive selector 71 selects the target constant speed $V_t$ as the target speed to be inputted to the speed feedback controller 75 (S820). The "acceleration" mode is set to the driving mode setting register 56 (S830). The speed feedback control at the time of acceleration is started (the carriage 5 starts to be driven) by the speed feedback controller 75 (S840).

After the carriage 5 starts to be driven, it is determined whether the timer value is an integral multiple of the constant frequency Tm (S850). If negatively determined (S850: NO), it is determined that the actual speed of the carriage 5 has reached the printable speed Vp (S870). Here, if negatively determined (S870: NO), it is further determined whether the current speed is not less than n % of the target constant speed $V_t$ (S890). If negatively determined (S890: NO), the timer value is updated (S900). The speed feedback control at the time of acceleration is continued (S840).

In the above, if the timer value has amounted to the integral multiple of the constant frequency Tm (S850: YES), the actual speed of the carriage 5 is pushed (stored) to the stack memory 58 (S860). Also, when the speed of the carriage 5 is increased and has reached the printable speed Vp (S870: YES), the "print" mode is set to the driving mode setting register 56 (S880).

The constant frequency Tm is predetermined to be the integral multiple of a control frequency Ts (Tm≧Ts) in the carriage control device 90. Accordingly, if Tm=Ts, it is always positively determined in the step of S850, and the actual speed is stored on the stack memory 58.

When the actual speed of the carriage 5 is not less than n % of the target constant speed $V_t$ (S890: YES), the travel distance of the carriage 5 during the acceleration control period is calculated based on the positions of the carriage 5 at the start of the acceleration and at the end of the acceleration, and the deceleration start position is calculated based on the travel distance and the target stop position set in the target stop setting register 51 (S910).

Then, the carriage 5 enters into the constant speed control period during which the carriage 5 is controlled to be the target constant speed $V_t$, and the speed feedback control is performed such that the carriage 5 maintains the target constant speed $V_t$ (S920). It is then determined whether the carriage 5 has reached the deceleration start position (s930). If positively determined (S930: YES), the speed directive selector 71 selects the deceleration directive f to start the deceleration control period (S940). That is, this point it the deceleration start timing.

A counter (not shown) is initialized to zero (0) (S950). It is determined whether the speed of the carriage 5 has fallen below the printable speed Vp (S960). If negatively determined (S960: NO), it is determined whether there are more than one actual speed data in the stack memory 58 (S980). If there are (S980: YES), two of the latest in order of storage of the speed records (actual speed) M2, M1 (M2>M1) at the time of the acceleration are popped (obtained) from the stack memory 58 (S990).

The deceleration directive f is calculated as follows (S1000).

$$f = M2 - \frac{\text{counter} * (M2 - M1)}{(Tm / Ts)} \tag{26}$$

The above calculation is for interpolation in case that the frequency Tm at which the actual speed is stored is larger than the control frequency To (integral multiple). For example, assuming that the control frequency Ts is 200 μsec. and the frequency Tm at which the actual speed is stored is 400 μsec., the frequency at which the actual speed stored in the stack memory 58 can be sequentially inputted as is as the deceleration directive f after the deceleration start timing is naturally the frequency of 400 μsec. On the other hand, since the control frequency Ts is 200 μsec., it is necessary that the deceleration directive f is inputted per 200 μsec. Accordingly, each time the control frequency Ts of 200 μsec. passes, cases alternatively occurs in which the data in the stack memory 58 can or cannot be inputted as is.

Accordingly, even at the timing when the data in the stack memory 58 cannot be inputted as is, the deceleration directive f is generated by the above formula (26) using the data stored in the stack memory 58.

Particularly, if counter=0, f=M2. The stored actual speed data is inputted to the speed feedback controller 75 as the deceleration directive f as is to perform the speed feedback control (S1020). Consequently, it is determined whether the carriage 5 has reached the target stop position (S1030). If not (S1030: NO), it is determined whether the counter value is not less than Tm/Ts−1 (S1040).

If the counter value is not less than Tm/Ts−1 (S1040: YES), the process returns to S950 again. If not (S1040; NO), the counter value is incremented by one (S1050). The process returns to S1000. If counter≧1, interpolation calculation based on M2 and M1 is performed according to the above formula (26). The deceleration directive f at the control timing can be obtained. The previously obtained M1 is obtained for a new M2, and an actual speed that is the latest other than M2 and M1 (prior to Tm) is obtained for a new M1, as the actual speed data newly obtained from the stack memory 58 when the step of S990 is performed again.

After the carriage 5 has reached the target stop position (S1030: YES), steps quite similar to S530 to S550 of FIG. 19 in the second embodiment are performed (S1060 to S1080).

(3) Effects

In the above described multi function apparatus 1 according to the present embodiment, the actual speed of the carriage 5 is sequentially stored at the constant frequency Tm during the acceleration control period. After the deceleration control start timing, the stored actual speed is inputted to the speed feedback controller 75 as the deceleration directive f, sequentially from the latest in order of storage. If the stored frequency Tm is larger than the control frequency Ts (integral multiple) and at the control timing when the actual speed cannot be outputted as the deceleration directive f as is, the deceleration directive f obtained by the interpolation calculation (formula (26)) based on the prior and posterior deceleration directives f (actual speed) is inputted.

Accordingly, in the present embodiment, the locus of the actual speed at the time of acceleration (speed rising locus) is directly symmetrically transformed in the time axis to form a locus in which the speed gradually falls, The falling locus is used as the deceleration directive f in the deceleration control period. In the control at the time of acceleration, as mentioned in the second embodiment, the controller is designed such that no high frequency component such as overshoot is included and the speed of the carriage smoothly is increased toward the target constant speed $V_r$. Accordingly, the actual speed which is the result of the control at the time of acceleration can be used as the deceleration directive f as is (by being symmetrically transformed in the time axis). As a result, a speed response with smooth speed change can be obtained, Accordingly, in the present embodiment as well as in the second embodiment, the shift from constant speed drive to deceleration is continuously performed, the speed change during the deceleration becomes smooth to suppress high frequency components, and printing with high precision can be achieved.

The present invention is not limited to the above described embodiments. The present invention can be practiced in various manners without departing from the technical scope of the invention.

For instance, in the above respective embodiments, the multi function apparatus 1 is illustrated as an image forming apparatus. However, the present invention may be applied to the other apparatus which necessitates a control of accelerating a driven body to a target constant speed, driving the driven body at the target constant speed for a certain period, and then decelerating the driven body to be stopped, as required.

What is claimed is:

1. A motor control method comprising the steps of:

performing a speed feedback control of a motor such that a speed of a body driven by the motor is consistent with a predetermined target speed, and generating a deceleration directive corresponding to time elapsed since a predetermined deceleration control start timing as the target speed using a deceleration function of the elapsed time, to perform the speed feedback control based on the generated deceleration directive, during a deceleration control period in a driving period, the driving period being from when the body starts to be driven until it is stopped, the deceleration control period starting from the deceleration control start timing and ending when the driven body is stopped, wherein the deceleration function is a function which monotonically decreases from the deceleration control start timing until the deceleration directive becomes zero (0) and of which derivative is a monotonically decreasing or increasing function or a constant.

2. The motor control method according to claim 1, wherein the deceleration function has a graph opening upward.

3. The motor control method according to claim 1, wherein the deceleration function has a graph opening downward.

4. The motor control method according to claim 1, wherein the deceleration function is a function of which integration value obtained when integrating the deceleration function from the deceleration control start timing until the deceleration directive becomes zero (0) is consistent with a deceleration distance which is a distance from a position of the driven body at the deceleration control start timing and a predetermined target stop position.

5. The motor control method according to claim 4, further comprising the steps of:

setting an initial deceleration directive which is the deceleration directive at the deceleration control start timing, formulating the deceleration function based on the deceleration distance and the initial deceleration directive, and calculating the deceleration directive corresponding to the elapsed time according to the deceleration function.

6. The motor control method according to claim 1, wherein the speed feedback control based on the deceleration directive is stopped when it is detected that the driven body has reached the target stop position, and a braking control of the motor is performed to stop the driven body.

7. The motor control method according to claim 1, wherein the speed feedback control is performed based on a predetermined target constant speed as the target speed during an acceleration control period in which the driven body is accelerated and a constant speed control period in which the driven body is driven at a constant speed in the driving period.

8. The motor control method according to claim 7, further comprising the step of:

measuring an acceleration time which is a period length of the acceleration control period, wherein the deceleration function is a function which continuously decreases from the target constant speed, of which deceleration directive time from the deceleration control start timing until the deceleration directive becomes zero (0) is consistent with the acceleration time, which monotonically decreases from the deceleration control start timing until the deceleration directive becomes zero (0), and of which derivative is a monotonically decreasing or increasing function or a constant.

9. The motor control method according to claim 8, wherein the acceleration time is from when the body starts to be driven until the speed of the driven body reaches n % (90>n°100) of the target constant speed.

10. The motor control method according to claim 7, wherein the deceleration function has a graph opening downward, and the deceleration directive at the deceleration control start timing takes a maximum value of the deceleration function.

11. The motor control method according to claim 10, wherein the deceleration function is a quadratic function.

12. A motor control device comprising:

a speed detection unit that detects a speed of a body driven by a motor;

a target speed setting unit that determines a target speed of the driven body;

a speed feedback control unit that compares the target speed determined by the target speed setting unit and the speed detected by the speed detection unit, and performs a speed feedback control of the motor in order to coincide the target speed with the speed of the driven body; and a deceleration directive generation unit that generates a deceleration directive which is the target speed of the driven body during a deceleration control period in a driving period, the driving period being from when the body starts to be driven until it is stopped, the deceleration control period starting from the deceleration control start timing and ending when the driven body is stopped, wherein the speed feedback control unit performs the speed feedback control based on the deceleration directive generated by the deceleration directive generation unit during the deceleration control period, the deceleration directive generation unit generates the deceleration directive corresponding to time elapsed from the deceleration control start timing using a deceleration function of the elapsed time, and the deceleration function is a function which monotonically decreases from the deceleration control start timing until the deceleration directive becomes zero (0) and of which derivative is a monotonically decreasing or increasing function or a constant.

13. The motor control device according to claim 12, wherein the deceleration function has a graph opening upward.

14. The motor control device according to claim 12, wherein the deceleration function has a graph opening downward.

15. The motor control device according to claim 12, further comprising a deceleration distance setting unit that sets a deceleration distance which is a distance from a position of the driven body at the deceleration control start timing and a predetermined target stop position, wherein the deceleration function is a function of which integration value obtained by integrating the deceleration function from the deceleration control start timing until the deceleration directive becomes zero (0) is consistent with the deceleration distance.

16. The motor control device according to claim 12, further comprising:

an arrival detection unit that detects whether the driven body has reached the target stop position; and a braking control unit that performs a braking control of the motor to stop the driven body, wherein when the arrival detection unit detects that the driven body has reached the target stop position, the speed feedback control unit stops the speed feedback control based on the deceleration directive, and the braking control unit performs the braking control.

17. The motor control device according to claim 15, further comprising an initial deceleration directive setting unit that determines an initial deceleration directive which is the deceleration directive at the deceleration control start timing, wherein the deceleration directive generation unit including:

a deceleration function formulation unit that formulates the deceleration function based on the deceleration directive determined by the deceleration distance setting unit and the initial deceleration directive determined by the initial deceleration directive setting unit;

a timing unit that measures the elapsed time; and a deceleration directive calculation unit that calculates the deceleration directive corresponding to the elapsed time measured by the timing unit according to the deceleration function formulated by the deceleration function formulation unit.

18. The motor control device according to claim 12, wherein the motor control device is mounted on an image forming apparatus provided with a function of forming an image on a recording medium while conveying the recording medium, and the driven body is a carriage that has a recording unit mounted thereon for forming an image on the recording medium and reciprocates in a main scanning direction orthogonal to a conveying direction of the recording medium.

19. The motor control device according to claim 12, further comprising an acceleration time measuring unit that measures an acceleration time which is a period length of the acceleration control period, the acceleration time measuring unit includes a first target speed input unit that inputs a predetermined target constant speed to the speed feedback control unit as the target speed during an acceleration control period in which the driven body is accelerated and a constant speed control period in which the body is driven at a constant speed, and a second target speed input unit that inputs the deceleration directive generated by the deceleration directive generation unit to the speed feedback control unit as the target speed during the deceleration control period, and the deceleration directive generation unit includes a deceleration function formulation unit that formulates the deceleration function using the acceleration time measured by the acceleration time measuring unit after the acceleration control period is ended until the deceleration control start timing.

20. The motor control device according to claim 19, wherein the acceleration time is from when the body starts to be driven until the speed of the driven body reaches n % (90>n°100) of the target constant speed.

21. The motor control device according to claim 19, wherein the deceleration function is a function which has a graph opening downward, and of which deceleration directive at the deceleration control start timing is a maximum value of the deceleration function.

22. The motor control device according to claim 21, wherein the deceleration function is a quadratic function.

* * * * *

UNITED STATES PATENT AND TRADEMARK OFFICE

CERTIFICATE OF CORRECTION

PATENT NO. : 7,449,850 B2
APPLICATION NO. : 11/528645
DATED : November 11, 2008
INVENTOR(S) : Kazushige Muroi It is certified that error appears in the above-identified patent and that said Letters Patent is hereby corrected as shown below:

In Column 26, Claim 9, Line 26:
Please delete "n % (90>n°100)" and insert --n % (90≤n<100)--

In Column 28, Claim 26, Line 38:
Please delete "n % (90>n°100)" and insert --n % (90≤n<100)--

Signed and Sealed this

Twenty-third Day of June, 2009

JOHN DOLL
*Acting Director of the United States Patent and Trademark Office*